(12) United States Patent
Choi et al.

(10) Patent No.: US 9,577,814 B2
(45) Date of Patent: Feb. 21, 2017

(54) METHOD AND APPARATUS FOR ALLOCATING RESOURCES IN CARRIER AGGREGATION SYSTEM

(71) Applicant: Samsung Electronics Co., Ltd., Suwon-si, Gyeonggi-do (KR)

(72) Inventors: Seung-Hoon Choi, Swuon-si (KR); Young-Bum Kim, Seoul (KR); Ju-Ho Lee, Suwon-si (KR); Hyoung-Ju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 14/616,022

(22) Filed: Feb. 6, 2015

(65) Prior Publication Data

US 2015/0230246 A1 Aug. 13, 2015

(30) Foreign Application Priority Data

Feb. 7, 2014 (KR) .................. 10-2014-0014469
Mar. 10, 2014 (KR) .................. 10-2014-0027847

(Continued)

(51) Int. Cl.
*H04J 3/00* (2006.01)
*H04L 5/14* (2006.01)
(Continued)

(52) U.S. Cl.
CPC .............. *H04L 5/14* (2013.01); *H04L 1/1861* (2013.01); *H04L 5/0048* (2013.01); *H04L 5/0053* (2013.01)

(58) Field of Classification Search
None
See application file for complete search history.

(56) References Cited

U.S. PATENT DOCUMENTS

2009/0203323 A1* 8/2009 Ratasuk ............... H04L 1/1854
455/68
2011/0149813 A1* 6/2011 Parkvall ............... H04B 7/2656
370/280

(Continued)

OTHER PUBLICATIONS

Samsung, Specification impact in case of FDD Pcell for TDD-FDD CA, 3GPP TSG RAN WG1 #76, R1-140360, Feb. 1, 2014, Prague, Czech Republic.

(Continued)

*Primary Examiner* — Otis L Thompson, Jr.
(74) *Attorney, Agent, or Firm* — Jefferson IP Law, LLP

(57) ABSTRACT

A method and apparatus for allocating resources in a base station (BS) in a carrier aggregation (CA) system is provided. The method and apparatus includes configuring a first cell and a second cell for a first user equipment (UE), identifying at least one second subframes of the first cell, the at least one second subframe being associated with feedback information to be received in a first subframe of the first cell, and at least one third subframes of the second cell, determining whether there is a downlink (DL) data transmission in the at least one third subframe of the second cell, and determining to allocate the other frequency resources, which are other than a frequency resource used for transmission of the feedback information in the first subframe, to a second UE, if there is no DL data transmission in the at least one third subframe of the second cell.

24 Claims, 22 Drawing Sheets

(30) Foreign Application Priority Data

Apr. 15, 2014 (KR) ........................ 10-2014-0044892
Nov. 26, 2014 (KR) ........................ 10-2014-0166604

(51) Int. Cl.
*H04L 1/18* (2006.01)
*H04L 5/00* (2006.01)

(56) References Cited

U.S. PATENT DOCUMENTS

| | | | |
|---|---|---|---|
| 2012/0257552 A1 | 10/2012 | Chen et al. | |
| 2013/0136108 A1* | 5/2013 | Cheng ................... | H04L 1/1861 370/336 |
| 2013/0170463 A1* | 7/2013 | Yang ..................... | H04L 1/1861 370/329 |
| 2013/0223301 A1* | 8/2013 | Lee ................... | H04W 72/1284 370/281 |
| 2013/0242812 A1* | 9/2013 | Khoryaev ........... | H04W 52/243 370/278 |
| 2014/0078981 A1* | 3/2014 | Larsson ................ | H04L 1/1607 370/329 |
| 2015/0092632 A1* | 4/2015 | Park ...................... | H04L 1/1861 370/280 |
| 2015/0373737 A1* | 12/2015 | Park ......................... | H04L 1/16 370/329 |
| 2016/0113007 A1* | 4/2016 | Centonza ............. | H04B 7/2656 370/280 |
| 2016/0183308 A1* | 6/2016 | Eriksson ............... | H04L 1/1812 370/329 |
| 2016/0192391 A1* | 6/2016 | Larsson ................ | H04L 1/1893 370/280 |
| 2016/0219595 A1* | 7/2016 | Larsson .................. | H04L 5/001 |

OTHER PUBLICATIONS

NTT DOCOMO, Design of HARQ feedback for TDD-FDD CA, 3GPP TSG RAN WG1 #76, R1-140618, Feb. 1, 2014, Prague, Czech Republic.

Texas Instruments, Further details on HARQ self-scheduling for TDD-FDD CA, 3GPP TSG RAN WG1 #76, R1-140534, Feb. 1, 2014, Prague, Czech Republic.

LG Electronics, UCI for TDD-FDD carrier aggregation, 3GPP TSG RAN WG1 #76, R1-140313 , Feb. 1, 2014, Prague, Czech Republic.

* cited by examiner

Transmission of Format 1b HARQ-ACK channel selection for $A = 4$

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1,1 |
| ACK | NACK/DTX | ACK | ACK | $n_{PUCCH,2}^{(1)}$ | 0,1 |
| NACK/DTX | ACK | ACK | ACK | $n_{PUCCH,1}^{(1)}$ | 0,1 |
| NACK/DTX | NACK/DTX | ACK | ACK | $n_{PUCCH,3}^{(1)}$ | 1,1 |
| ACK | ACK | ACK | NACK/DTX | $n_{PUCCH,1}^{(1)}$ | 1,0 |
| ACK | NACK/DTX | ACK | NACK/DTX | $n_{PUCCH,2}^{(1)}$ | 0,0 |
| NACK/DTX | ACK | ACK | NACK/DTX | $n_{PUCCH,1}^{(1)}$ | 0,0 |
| NACK/DTX | NACK/DTX | ACK | NACK/DTX | $n_{PUCCH,3}^{(1)}$ | 1,0 |
| ACK | ACK | NACK/DTX | ACK | $n_{PUCCH,2}^{(1)}$ | 1,1 |
| ACK | NACK/DTX | NACK/DTX | ACK | $n_{PUCCH,2}^{(1)}$ | 1,0 |
| NACK/DTX | ACK | NACK/DTX | ACK | $n_{PUCCH,3}^{(1)}$ | 0,1 |
| NACK/DTX | NACK/DTX | NACK/DTX | ACK | $n_{PUCCH,3}^{(1)}$ | 0,0 |
| ACK | ACK | NACK/DTX | NACK/DTX | $n_{PUCCH,0}^{(1)}$ | 1,1 |
| ACK | NACK/DTX | NACK/DTX | NACK/DTX | $n_{PUCCH,0}^{(1)}$ | 1,0 |
| NACK/DTX | ACK | NACK/DTX | NACK/DTX | $n_{PUCCH,0}^{(1)}$ | 0,1 |
| NACK/DTX | NACK | NACK/DTX | NACK/DTX | $n_{PUCCH,0}^{(1)}$ | 0,0 |
| NACK | NACK/DTX | NACK/DTX | NACK/DTX | $n_{PUCCH,0}^{(1)}$ | 0,0 |
| DTX | DTX | NACK/DTX | NACK/DTX | No Transmission | |

FIG.3A

Transmission of Format 1b HARQ-ACK channel selection for $A = 4$

| HARQ-ACK(0) | HARQ-ACK(1) | HARQ-ACK(2) | HARQ-ACK(3) | $n^{(1)}_{PUCCH}$ | b(0)b(1) |
|---|---|---|---|---|---|
| ACK | ACK | ACK | ACK | $n^{(1)}_{PUCCH,1}$ | 1,1 |
| ACK | NACK/DTX | ACK | ACK | $n^{(1)}_{PUCCH,2}$ | 0,1 |
| NACK/DTX | ACK | ACK | ACK | $n^{(1)}_{PUCCH,1}$ | 0,1 |
| NACK/DTX | NACK/DTX | ACK | ACK | $n^{(1)}_{PUCCH,3}$ | 1,1 |
| ACK | ACK | ACK | NACK/DTX | $n^{(1)}_{PUCCH,1}$ | 1,0 |
| ACK | NACK/DTX | ACK | NACK/DTX | $n^{(1)}_{PUCCH,2}$ | 0,0 |
| NACK/DTX | ACK | ACK | NACK/DTX | $n^{(1)}_{PUCCH,1}$ | 0,0 |
| NACK/DTX | NACK/DTX | ACK | NACK/DTX | $n^{(1)}_{PUCCH,3}$ | 1,0 |
| ACK | ACK | NACK/DTX | ACK | $n^{(1)}_{PUCCH,2}$ | 1,1 |
| ACK | NACK/DTX | NACK/DTX | ACK | $n^{(1)}_{PUCCH,2}$ | 1,0 |
| NACK/DTX | ACK | NACK/DTX | ACK | $n^{(1)}_{PUCCH,3}$ | 0,1 |
| NACK/DTX | NACK/DTX | NACK/DTX | ACK | $n^{(1)}_{PUCCH,3}$ | 0,0 |
| ACK | ACK | NACK/DTX | NACK/DTX | $n^{(1)}_{PUCCH,0}$ | 1,1 |
| ACK | NACK/DTX | NACK/DTX | NACK/DTX | $n^{(1)}_{PUCCH,0}$ | 1,0 |
| NACK/DTX | ACK | NACK/DTX | NACK/DTX | $n^{(1)}_{PUCCH,0}$ | 0,1 |
| NACK/DTX | NACK | NACK/DTX | NACK/DTX | $n^{(1)}_{PUCCH,0}$ | 0,0 |
| NACK | NACK/DTX | NACK/DTX | NACK/DTX | $n^{(1)}_{PUCCH,0}$ | 0,0 |
| DTX | DTX | NACK/DTX | NACK/DTX | No Transmission | |

FIG.3B

Transmission of Format 1b HARQ-ACK channel selection for $A = 4$

| HARQ-ACK(0) | HARQ-ACK(1) | HARQ-ACK(2) | HARQ-ACK(3) | $n^{(1)}_{PUCCH}$ | b(0)b(1) |
|---|---|---|---|---|---|
| ACK | ACK | ACK | ACK | $n^{(1)}_{PUCCH,1}$ | 1,1 |
| ACK | NACK/DTX | ACK | ACK | $n^{(1)}_{PUCCH,2}$ | 0,1 |
| NACK/DTX | ACK | ACK | ACK | $n^{(1)}_{PUCCH,1}$ | 0,1 |
| NACK/DTX | NACK/DTX | ACK | ACK | $n^{(1)}_{PUCCH,3}$ | 1,1 |
| ACK | ACK | ACK | NACK/DTX | $n^{(1)}_{PUCCH,1}$ | 1,0 |
| ACK | NACK/DTX | ACK | NACK/DTX | $n^{(1)}_{PUCCH,2}$ | 0,0 |
| NACK/DTX | ACK | ACK | NACK/DTX | $n^{(1)}_{PUCCH,1}$ | 0,0 |
| NACK/DTX | NACK/DTX | ACK | NACK/DTX | $n^{(1)}_{PUCCH,3}$ | 1,0 |
| ACK | ACK | NACK/DTX | ACK | $n^{(1)}_{PUCCH,2}$ | 1,1 |
| ACK | NACK/DTX | NACK/DTX | ACK | $n^{(1)}_{PUCCH,2}$ | 1,0 |
| NACK/DTX | ACK | NACK/DTX | ACK | $n^{(1)}_{PUCCH,3}$ | 0,1 |
| NACK/DTX | NACK/DTX | NACK/DTX | ACK | $n^{(1)}_{PUCCH,3}$ | 0,0 |
| ACK | ACK | NACK/DTX | NACK/DTX | $n^{(1)}_{PUCCH,0}$ | 1,1 |
| ACK | NACK/DTX | NACK/DTX | NACK/DTX | $n^{(1)}_{PUCCH,0}$ | 1,0 |
| NACK/DTX | ACK | NACK/DTX | NACK/DTX | $n^{(1)}_{PUCCH,0}$ | 0,1 |
| NACK/DTX | NACK | NACK/DTX | NACK/DTX | $n^{(1)}_{PUCCH,0}$ | 0,0 |
| NACK | NACK/DTX | NACK/DTX | NACK/DTX | $n^{(1)}_{PUCCH,0}$ | 0,0 |
| DTX | DTX | NACK/DTX | NACK/DTX | No Transmission | |

FIG.3C

Transmission of HARQ-ACK multiplexing for $M=3$

| Primary Cell HARQ-ACK(0) HARQ-ACK(1) HARQ-ACK(2) | Secondary Cell HARQ-ACK(0) HARQ-ACK(1) HARQ-ACK(2) | Resource $n_{PUCCH}^{(1)}$ | Constellation $b(0),b(1)$ | RM Cod Input Bits $o(0),o(1),o(2),o(3)$ |
|---|---|---|---|---|
| ACK,ACK,ACK | ACK,ACK,ACK | $n_{PUCCH,1}^{(1)}$ | 1,1 | 1,1,1,1 |
| ACK,ACK,NACK/DTX | ACK,ACK,ACK | $n_{PUCCH,1}^{(1)}$ | 0,0 | 1,0,1,1 |
| ACK,NACK/DTX,any | ACK,ACK,ACK | $n_{PUCCH,3}^{(1)}$ | 1,1 | 0,1,1,1 |
| NACK/DTX,any,any | ACK,ACK,ACK | $n_{PUCCH,3}^{(1)}$ | 0,1 | 0,0,1,1 |
| ACK,ACK,ACK | ACK,ACK,NACK/DTX | $n_{PUCCH,0}^{(1)}$ | 1,0 | 1,1,1,0 |
| ACK,ACK,NACK/DTX | ACK,ACK,NACK/DTX | $n_{PUCCH,3}^{(1)}$ | 1,0 | 1,0,1,0 |
| ACK,NACK/DTX,any | ACK,ACK,NACK/DTX | $n_{PUCCH,0}^{(1)}$ | 0,1 | 0,1,1,0 |
| NACK/DTX,any,any | ACK,ACK,NACK/DTX | $n_{PUCCH,3}^{(1)}$ | 0,0 | 0,0,1,0 |
| ACK,ACK,ACK | ACK,NACK/DTX,any | $n_{PUCCH,2}^{(1)}$ | 1,1 | 1,1,0,1 |
| ACK,ACK,NACK/DTX | ACK,NACK/DTX,any | $n_{PUCCH,2}^{(1)}$ | 0,1 | 1,0,0,1 |
| ACK,NACK/DTX,any | ACK,NACK/DTX,any | $n_{PUCCH,2}^{(1)}$ | 1,0 | 0,1,0,1 |
| NACK/DTX,any,any | ACK,NACK/DTX,any | $n_{PUCCH,2}^{(1)}$ | 0,0 | 0,0,0,1 |
| ACK,ACK,ACK | NACK/DTX,any,any | $n_{PUCCH,1}^{(1)}$ | 1,0 | 1,1,0,0 |
| ACK,ACK,NACK/DTX | NACK/DTX,any,any | $n_{PUCCH,1}^{(1)}$ | 0,1 | 1,0,0,0 |
| ACK,NACK/DTX,any | NACK/DTX,any,any | $n_{PUCCH,0}^{(1)}$ | 1,1 | 0,1,0,0 |
| NACK,any,any | NACK/DTX,any,any | $n_{PUCCH,0}^{(1)}$ | 0,0 | 0,0,0,0 |
| DTX,any,any | NACK/DTX,any,any | No Transmission | | 0,0,0,0 |

FIG.3D

Transmission of HARQ-ACK multiplexing for $M = 3$

| Primary Cell | Secondary Cell | Resource | Constellation | RM Cod Input Bits |
|---|---|---|---|---|
| HARQ-ACK(0) HARQ-ACK(1) HARQ-ACK(2) | HARQ-ACK(0) HARQ-ACK(1) HARQ-ACK(2) | $n_{PUCCH}^{(1)}$ | b(0),b(1) | o(0),o(1), o(2),o(3) |
| ACK,ACK,ACK | ACK,ACK,ACK | $n_{PUCCH,1}^{(1)}$ | 1,1 | 1,1,1,1 |
| ACK,ACK,NACK/DTX | ACK,ACK,ACK | $n_{PUCCH,1}^{(1)}$ | 0,0 | 1,0,1,1 |
| ACK,NACK/DTX,any | ACK,ACK,ACK | $n_{PUCCH,3}^{(1)}$ | 1,1 | 0,1,1,1 |
| NACK/DTX,any,any | ACK,ACK,ACK | $n_{PUCCH,3}^{(1)}$ | 0,1 | 0,0,1,1 |
| ACK,ACK,ACK | ACK,ACK,NACK/DTX | $n_{PUCCH,0}^{(1)}$ | 1,0 | 1,1,1,0 |
| ACK,ACK,NACK/DTX | ACK,ACK,NACK/DTX | $n_{PUCCH,3}^{(1)}$ | 1,0 | 1,0,1,0 |
| ACK,NACK/DTX,any | ACK,ACK,NACK/DTX | $n_{PUCCH,0}^{(1)}$ | 0,1 | 0,1,1,0 |
| NACK/DTX,any,any | ACK,ACK,NACK/DTX | $n_{PUCCH,3}^{(1)}$ | 0,0 | 0,0,1,0 |
| ACK,ACK,ACK | ACK,NACK/DTX,any | $n_{PUCCH,2}^{(1)}$ | 1,1 | 1,1,0,1 |
| ACK,ACK,NACK/DTX | ACK,NACK/DTX,any | $n_{PUCCH,2}^{(1)}$ | 0,1 | 1,0,0,1 |
| ACK,NACK/DTX,any | ACK,NACK/DTX,any | $n_{PUCCH,2}^{(1)}$ | 1,0 | 0,1,0,1 |
| NACK/DTX,any,any | ACK,NACK/DTX,any | $n_{PUCCH,2}^{(1)}$ | 0,0 | 0,0,0,1 |
| ACK,ACK,ACK | NACK/DTX,any,any | $n_{PUCCH,1}^{(1)}$ | 1,0 | 1,1,0,0 |
| ACK,ACK,NACK/DTX | NACK/DTX,any,any | $n_{PUCCH,1}^{(1)}$ | 0,1 | 1,0,0,0 |
| ACK,NACK/DTX,any | NACK/DTX,any,any | $n_{PUCCH,0}^{(1)}$ | 1,1 | 0,1,0,0 |
| NACK,any,any | NACK/DTX,any,any | $n_{PUCCH,0}^{(1)}$ | 0,0 | 0,0,0,0 |
| DTX,any,any | NACK/DTX,any,any | No Transmission | | 0,0,0,0 |

FIG.3E

Transmission of Format 1b HARQ-ACK channel selection for $A = 4$

| HARQ-ACK(0) | HARQ-ACK(1) | HARQ-ACK(2) | HARQ-ACK(3) | $n^{(1)}_{PUCCH}$ | b(0)b(1) |
|---|---|---|---|---|---|
| ACK | ACK | ACK | ACK | $n^{(1)}_{PUCCH,1}$ | 1,1 |
| ACK | NACK/DTX | ACK | ACK | $n^{(1)}_{PUCCH,2}$ | 0,1 |
| NACK/DTX | ACK | ACK | ACK | $n^{(1)}_{PUCCH,1}$ | 0,1 |
| NACK/DTX | NACK/DTX | ACK | ACK | $n^{(1)}_{PUCCH,3}$ | 1,1 |
| ACK | ACK | ACK | NACK/DTX | $n^{(1)}_{PUCCH,1}$ | 1,0 |
| ACK | NACK/DTX | ACK | NACK/DTX | $n^{(1)}_{PUCCH,2}$ | 0,0 |
| NACK/DTX | ACK | ACK | NACK/DTX | $n^{(1)}_{PUCCH,1}$ | 0,0 |
| NACK/DTX | NACK/DTX | ACK | NACK/DTX | $n^{(1)}_{PUCCH,3}$ | 1,0 |
| ACK | ACK | NACK/DTX | ACK | $n^{(1)}_{PUCCH,2}$ | 1,1 |
| ACK | NACK/DTX | NACK/DTX | ACK | $n^{(1)}_{PUCCH,2}$ | 1,0 |
| NACK/DTX | ACK | NACK/DTX | ACK | $n^{(1)}_{PUCCH,3}$ | 0,1 |
| NACK/DTX | NACK/DTX | NACK/DTX | ACK | $n^{(1)}_{PUCCH,3}$ | 0,0 |
| ACK | ACK | NACK/DTX | NACK/DTX | $n^{(1)}_{PUCCH,0}$ | 1,1 |
| ACK | NACK/DTX | NACK/DTX | NACK/DTX | $n^{(1)}_{PUCCH,0}$ | 1,0 |
| NACK/DTX | ACK | NACK/DTX | NACK/DTX | $n^{(1)}_{PUCCH,0}$ | 0,1 |
| NACK/DTX | NACK | NACK/DTX | NACK/DTX | $n^{(1)}_{PUCCH,0}$ | 0,0 |
| NACK | NACK/DTX | NACK/DTX | NACK/DTX | $n^{(1)}_{PUCCH,0}$ | 0,0 |
| DTX | DTX | NACK/DTX | NACK/DTX | No Transmission | |

FIG.3F

METHOD AND APPARATUS FOR ALLOCATING RESOURCES IN CARRIER AGGREGATION SYSTEM

CROSS-REFERENCE TO RELATED APPLICATION(S)

This application claims the benefit under 35 U.S.C. §119 (a) of a Korean patent application filed on Feb. 7, 2014 in the Korean Intellectual Property Office and assigned Serial number 10-2014-0014469, a Korean patent application filed on Mar. 10, 2014 in the Korean Intellectual Property Office and assigned Serial number 10-2014-0027847, a Korean patent application filed on Apr. 15, 2014 in the Korean Intellectual Property Office and assigned Serial number 10-2014-0044892, and a Korean patent application filed on Nov. 26, 2014 in the Korean Intellectual Property Office and assigned Serial number 10-2014-0166604, the entire disclosures of each of which are hereby incorporated by reference.

TECHNICAL FIELD

The present disclosure relates to an apparatus and method for allocating resources in a carrier aggregation (CA) communication system.

BACKGROUND

Generally, mobile communication systems have been developed to provide voice services while guaranteeing a user's mobility. Such mobile communication systems have gradually expanded their coverage from voice services through data services up to high-speed data services. However, as current mobile communication systems suffer resource shortages and users demand even higher-speed services, development of more advanced mobile communication systems is needed.

For example, long term evolution-advanced (LTE-A) is a technology for implementing high-speed packet-based communication having a data rate of a maximum of 1 Gbps. A downlink (DL) refers to a communication link originating from a base station (BS) node B (NB), or an enhanced NB (eNB) to a mobile station (MS) or a user equipment (UE), and an uplink (UL) refers to a communication link originating from a UE to a BS. The UL carries data signals including information content, control signals providing information associated with the transmission of DL signals, and reference signals (RSs). The DL also carries data signals, control signals, and RSs.

DL data signals are transmitted through physical downlink shared channels (PDSCHs), and UL data signals are transmitted through physical uplink shared channels (PUSCHs). The DL control signals may be broadcast or transmitted to a UE in a particular state. UE-specific control channels may be used to provide scheduling assignments (SAs) for PDSCH reception or PUSCH transmission. SAs are transmitted from a BS to respective UEs through respective physical downlink control channels (PDCCHs) by using DL control information (DCI) formats. The PDCCH may convey a hybrid automatic repeat request (HARQ) response with respect to the PUSCH. UL control signals may be transmitted on the PUSCH together with data, or may be transmitted through a physical uplink control channel (PUCCH). UL control signals may include at least one of the HARQ response with respect to the PDSCH and other feedback information.

The LTE-A considers carrier aggregation (CA) of multiple cells to support a higher data rate. The multiple cells may include one primary cell (Pcell) and at least one secondary cell (Scell), and a feedback generated for each cell may be transferred only to the Pcell.

Thus, a need exists for a technique for scheduling resources of a BS for multiple cells without affecting system performance in a communication system such as a CA communication system using multiple frequency bands.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for allocating resources in a carrier aggregation (CA) communication system.

Another aspect of the present disclosure is to provide a method and apparatus for allocating resources in a CA communication system where a duplex structure differs between cells.

Moreover, various aspects of the present disclosure provide a method and apparatus for allocating resources in a CA communication system where a duplex structure is identical between cells.

Other objects to be provided in the present disclosure may be understood by embodiments described below.

In accordance with an aspect of the present disclosure, a method for allocating resources by a base station (BS) in a CA system is provided. The method includes configuring a first cell and a second cell for a first user equipment (UE), identifying at least one second subframes of the first cell, the at least one second subframe being associated with feedback information to be received in a first subframe of the first cell, and at least one third subframe of the second cell, determining whether there is downlink (DL) data transmission in the at least one third subframe of the second cell, and determining to allocate other frequency resources, which are other than a frequency resource used for transmission of the feedback information in the first subframe, to a second UE if there is no DL data transmission in the third subframe of the second cell.

In accordance with another aspect of the present disclosure, an apparatus for allocating resources in a BS in a CA system is provided. The apparatus includes a transceiver configured to communicate a radio signal with a first UE and a second UE and a controller configured to configure a first cell and a second cell for the first UE, to identify at least one second subframe of the first cell, the at least one second subframe being associated with feedback information to be received in a first subframe of the first cell, and at least one third subframe of the second cell, to determine whether there is DL data transmission in the at least one third subframe of the second cell, and to determine to allocate other frequency resources, which are other than a frequency resource used for transmission of the feedback information in the first subframe, to a second UE if there is no DL data transmission in the third subframe of the second cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3A illustrates a PUCCH format used when a frequency division duplex (FDD) Pcell and a time division duplex (TDD) Scell are configured according to an embodiment of the present disclosure;

FIGS. 3B and 3C illustrate PUCCH formats used when an FDD Pcell and a TDD Scell are configured according to an embodiment of the present disclosure;

FIGS. 3D and 3E illustrate PUCCH formats used when a TDD Pcell and a TDD Scell are configured according to an embodiment of the present disclosure;

FIG. 3F illustrates a PUCCH format used when a PUCCH transmission resource is configured to be shared with a user equipment (UE) according to an embodiment of the present disclosure according to an embodiment of the present disclosure;

Throughout the drawings, like reference numerals will be understood to refer to like parts, components, and structures.

DETAILED DESCRIPTION

Figure 1A:
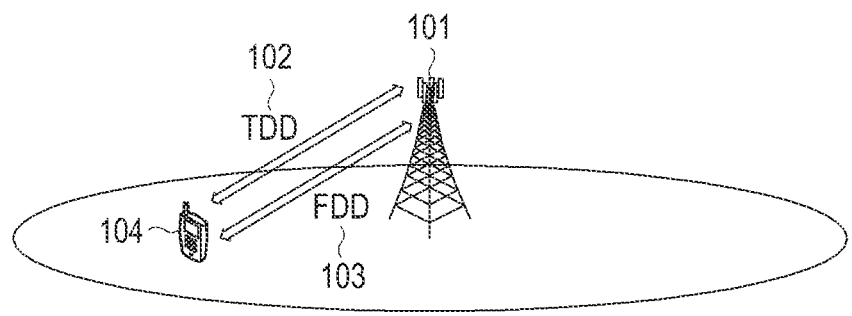
FIGS. 1A and 1B illustrate a communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms "have", "may have", "include", or "may include" used in various embodiments of the present disclosure indicate an existence of disclosed function, operation, or component, but do not limit an existence of one or more other functions, operations, or components.

Herein, the expressions such as "A or B", "at least one of A or/B", and "one or more of A or/and B" may include all possible combinations of items listed together. For example, "A or B", "at least one of A or/B", and "one or more of A or/and B" may refer to (1) including at least one A, (2) including at least one B, and (3) including at least one A and at least one B.

Although ordinal numbers such as "first", "second", and so forth will be used to describe various components, those components are not limited by the terms. For example, the terms do not limit the order and/or importance of the components. The terms are used for distinguishing one component from another component. For example, a first user device and a second user device are both user devices, and indicate different user devices. Also, a first component may be referred to as a second component and likewise, a second component may also be referred to as a first component, without departing from the teaching of the present disclosure.

When it is said that a component, for example, a first component, is "connected" or "coupled" with another component, for example, a second component, the component may be directly connected with another component, or still another component, for example, a third component, may exist between the components. On the other hand, when it is said that a component is "directly connected" or "directly coupled" with another component, no component exists between the components.

As used in the present disclosure, without limitation, the phrase "configured to" may be interchangeably used with other terms, such as "suitable for," "having the capacity to," "designed to," "adapted to," "made to," or "capable of," depending on the circumstances. In certain examples, the term "configured to" may not necessarily mean "specifically designed to" in a hardware sense. Rather, in a certain context, the term "configured to" may mean "capable of" with assistance of other devices or components. For example, the phrase "a processor configured to perform A, B, and C" may mean a dedicated processor, for example, an embedded processor, for performing corresponding operations or a generic-purpose processor, for example, a central processing unit (CPU) or an application processor, that may perform corresponding operations by executing one or more software programs stored in a memory device.

Terms used in various embodiments of the present disclosure are intended to describe an embodiment, rather than to limit the various embodiments of the present disclosure. As used herein, the singular forms are intended to include the plural forms as well, unless the context clearly indicates otherwise. Unless otherwise defined, all terms, including technical and scientific terms, used herein have the same meaning as commonly understood by one of ordinary skill in the art to which embodiments belong. It will be further understood that terms, such as those defined in commonly used dictionaries, should be interpreted as having a meaning that is consistent with their meaning in the specification with the context of the relevant art as understood by the artisan at the time of disclosure and will not be interpreted in an idealized or overly formal sense unless expressly so defined herein.

Hereinafter, various embodiments of the present disclosure will be described in relation to the accompanying drawings. In the following description, a detailed description of known functions and configurations incorporated herein will be omitted when it may obscure the subject matter of the present disclosure. Terms used herein are defined based on functions in the present disclosure and may vary according to users, operators' intention or usual practices. Therefore, the definition of the terms should be made based on contents throughout the specification.

Hereinbelow, a description will be made of a long term evolution (LTE) system and a LTE-advanced (LTE-A) system, but embodiments of the present disclosure to be described below may also be applied to other communication systems which support multiple frequency bands and to which base station (BS) scheduling is applied.

An orthogonal frequency division multiplexing (OFDM) transmission scheme is a data transmission scheme using multi-carriers, and is a type of multi-carrier modulation that parallelizes a serially input symbol sequence and modulates the parallelized symbols into multiple carriers having a mutually orthogonal relationship, that is, multiple subcarrier channels for transmission.

In the OFDM scheme, a modulation signal is situated on two-dimensional (2D) resources composed of time and frequency. Resources on a time axis are divided into different OFDM symbols that are orthogonal to each other. Resources on a frequency axis are divided into different subcarriers that are orthogonal to each other. In OFDM, if a particular OFDM symbol is designated based on the time axis and a particular subcarrier is designated based on the frequency axis, one minimum unit resource may be indicated, which is referred to as a resource element (RE). Although different REs pass through a frequency selective channel, they are orthogonal to each other, such that signals transmitted to different REs may be received at a receiving side without causing mutual interference.

A physical channel is a channel of a physical layer transmitting a modulation symbol that modulates one or more encoded bit streams. An orthogonal frequency division multiple access (OFDMA) system configures and transmits a plurality of physical channels according to application of information sequences to be transmitted or a receiver. A transmitter and a receiver will mutually agree in advance in which RE one physical channel is to be disposed when it is transmitted, which is a rule called mapping.

In an OFDM communication system, a downlink (DL) bandwidth includes multiple resource blocks (RBs), and each physical resource block (PRB) includes a plurality of, for example, twelve, subcarriers arranged along the frequency axis and a plurality of, for example, fourteen or twelve, OFDM symbols arranged along the time axis. A PRB is a basic unit of resource allocation.

A reference signal (RS) is a signal transmitted from a BS to allow a user equipment (UE) to perform channel estimation. In an LTE communication system, the RS includes a common reference signal (CRS) and a demodulation reference signal (DMRS) which is one of dedicated RSs.

The CRS is an RS that is transmitted across the entire DL band and may be received to all UEs, and is used for channel estimation, feedback information configuration of a UE, or modulation of a control channel and a data channel. The DMRS is an RS that is transmitted across the entire DL band and is used for data channel demodulation and channel estimation for a particular UE, and is not used for feedback information configuration, unlike the CRS. Thus, the DMRS is transmitted through PRB resources the UE is to schedule.

On the time axis, a subframe includes two slots having a length of 0.5 msec, that is, a first slot and a second slot. A physical downlink control channel (PDCCH) region, which is a control channel region, and an enhanced PDCCH (ePDCCH) region, which is a data channel region, are transmitted separately on the time axis, for fast reception and demodulation of a control channel signal. The PDCCH region is situated across the entire DL band, in which one control channel is divided into small-unit control channels that are distributed over the entire DL band.

In LTE-A, each cell configured for a UE may have a frequency division duplex (FDD) structure or a time division duplex (TDD) structure. A cell having the FDD structure, also called an 'FDD cell', has a frequency for DL transmission and a frequency for uplink (UL) transmission. A cell having the TDD structure, also called a 'TDD cell', has a static TDD structure in which a UL-DL configuration is maintained, or a dynamic TDD structure in which a UL-DL configuration changes due to system information, high layer signaling, or a DL common control channel.

If one cell controlled by a BS has an FDD structure and one frequency band is added as a new cell for a UE, it is easy to apply the TDD structure to the cell of the added frequency band. This is because for operation of FDD, different two frequency bands are needed between a DL and an UL.

The TDD cell may have one of a plurality of UL-DL configurations. Table 1 shows an example of TDD UL-DL configurations. A radio frame of the TDD cell includes ten subframes which function as a UL subframe, as DL subframes, or as a special subframe according to a TDD UL-DL configuration.

TABLE 1

| Config-uration Serial No. | Switching Point Cycle | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Herein, U refers to an UL subframe, D refers to a DL subframe, and S refers to a special subframe. The special subframe includes a downlink pilot time slot (DwPTS), a guard period (GP), and an uplink pilot time slot (UpPTS). The DwPTS is a period for performing DL transmission in succession to an immediately previous DL subframe #1 or #6. The GP provides time needed for a UE to switch from a DL to an UL. The UpPTS is a period for performing UL transmission in an immediately next UL subframe #3 or #8. Lengths of the DwPTS, the GP, and the UpPTS on the time axis are defined by a special subframe configuration, and the special subframe configuration of the TDD cell is transmitted to a UE through high-layer signaling.

Figure 1B:
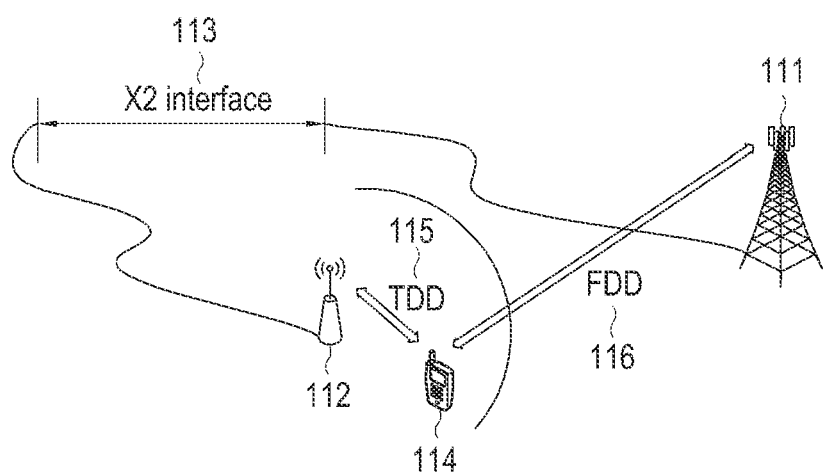

FIGS. 1A and 1B illustrate a communication system according to an embodiment of the present disclosure.

Referring to FIG. 1A, in a network, a TDD cell 102 and an FDD cell 103 may be used by one BS 101. A UE 104 transmits data to and receives data from the BS 101 through the TDD cell 102 and the FDD cell 103. UL transmission of the UE 104 is performed through a primary cell (Pcell). For example, the UE 104 performs UL transmission through the TDD cell 102 if the TDD cell 102 is a Pcell, and performs UL transmission through the FDD cell 103 if the FDD cell 103 is a Pcell.

Referring to FIG. 1B, in a network, a macro BS 111 for a wide coverage and a pico BS 112 for increasing an amount of data transmission that may coexist. In this case, the macro BS 111 uses an FDD scheme 116 and the pico BS 112 uses a TDD scheme 115 to transmit data to and receive data from a UE 114. If an ideal backhaul network is installed for communication using an X2 interface 113 between the macro BS 111 and the pico BS 112, UL transmission may be performed through the macro BS 111. That is, if UL data is transmitted only to the macro BS 111, the pico BS 112 may receive control information associated with UL transmission from the macro BS 111 in real time through the communication 113 between the macro BS 111 and the pico BS 112. On the other hand, if there is no ideal backhaul network between the macro BS 111 and the pico BS 112, the UL data needs to be transmitted from the UE 114 to the macro BS 111 and the pico BS 112.

As illustrated in FIG. 1A or 1B, for a communication system including a plurality of cells for a UE, a cell managing UL transmission, that is, a Pcell, may carry a PUCCH including a hybrid automatic repeat request (HARQ) feedback with respect to a physical downlink shared channel (PDSCH) transmitted in other cells, that is, secondary cells (Scells). The HARQ feedback may be an acknowledgement (ACK) indicating that a decoding result with respect to a codeword of the PDSCH is successful, a non-acknowledgement (NACK) indicating that the decoding result with respect to the codeword of the PDSCH fails, or a discontinuous transmission (DTX) indicating that the PDSCH is not detected.

Figure 2A:
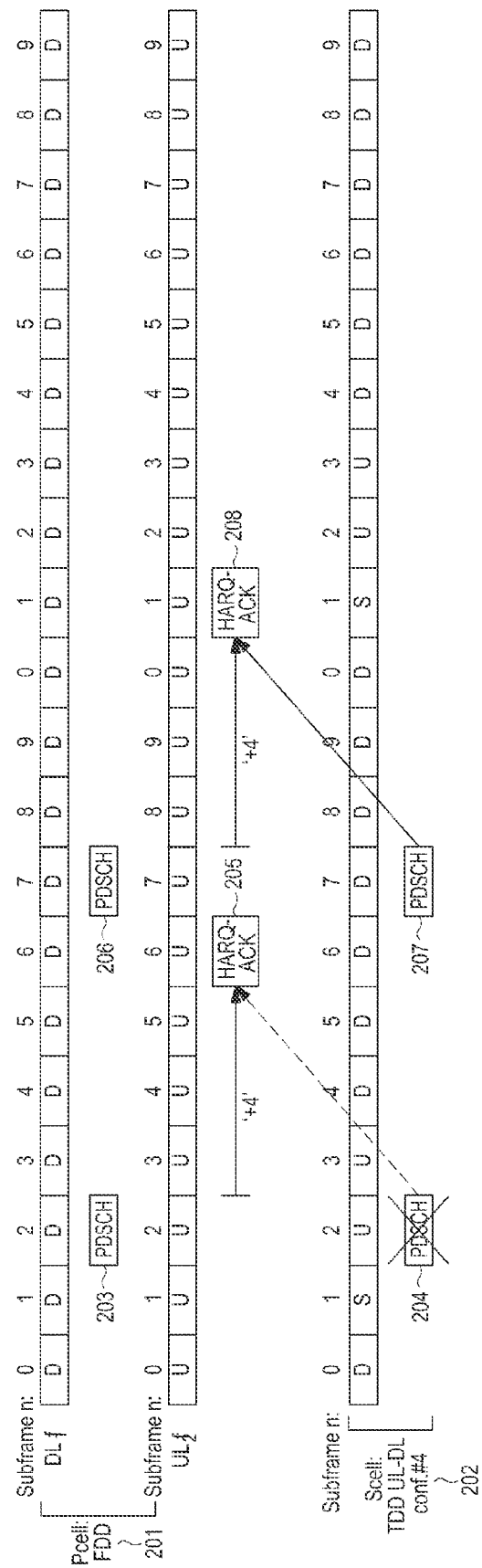
FIG. 2A illustrates physical uplink control channel (PUCCH) transmission hybrid automatic repeat request (HARQ) timing for a physical downlink shared channel (PDSCH) transmitted in a secondary cell (Scell) according to a first embodiment of the present disclosure.

FIG. 2A illustrates physical uplink control channel (PUCCH) transmission HARQ timing for a PDSCH transmitted in a Scell according to a first embodiment of the present disclosure.

Referring to FIG. 2A, in which control channel transmission using timing of an FDD cell is illustrated, a description will be made of a procedure for determining UL control channel transmission timing of an FDD cell to transmit an UL control channel, that is, an HARQ feedback in a PUCCH, for DL data of a TDD cell.

As illustrated in FIG. 2A, a Pcell cell 201 and a Scell 202 using different duplex schemes may be configured for a UE. In FIG. 2A, the Pcell 201, which may be referred to as an FDD cell 201, uses the FDD scheme, uses $f_1$ as a frequency for DL transmission, and uses $f_2$ as a frequency for UL transmission. The Scell 202, which may be referred to as a TDD cell 202, uses the TDD scheme and uses DL subframes and UL subframes that are configured, for example, according to a TDD UL-DL configuration #4.

If a PDSCH 207 is scheduled in a subframe #7 of the TDD cell 202, an HARQ-ACK 208, including an HARQ response with respect to the PDSCH 207, may be transmitted four subframes after the subframe #7 of the TDD cell 202, that is, in an UL subframe #1 of the frequency $f_2$ of the FDD cell 201, according to an UL control channel transmission timing of the FDD cell 201. If a PDSCH 206 of the FDD cell 201 is scheduled in a subframe #7, an HARQ response with respect to the PDSCH 206 is multiplexed and transmitted, together with the HARQ response with respect to the PDSCH 207, in the HARQ-ACK 208 four subframes after the subframe #7 of the FDD cell 201, that is, in the UL subframe #1 of the frequency $f_2$ of the FDD cell 201.

If a PDSCH 203 of the FDD cell 201 is scheduled in a subframe #2, an HARQ-ACK 205, including an HARQ response with respect to the PDSCH 203, is transmitted four subframes after the subframe #2 of the FDD cell 201, that is, in an UL subframe #6 of the frequency $f_2$ of the FDD cell 201. Since a subframe #2 of the TDD cell 202 is an UL subframe, a PDSCH 204 may not be scheduled for the subframe #2 of the TDD cell 202. Thus, the HARQ-ACK 205 transmitted in the UL subframe #6 of the frequency $f_2$ of the FDD cell 201 includes DTX as an HARQ response of the TDD cell 202, together with an HARQ response with respect to the PDSCH 203 of the FDD cell 201. The HARQ response of the DTX may indicate that PDSCH transmission does not exist or the PDSCH is not detected. That is, in a situation as illustrated in FIG. 2A, the HARQ response of the TDD cell 202 is limited to the DTX.

Figure 2B:
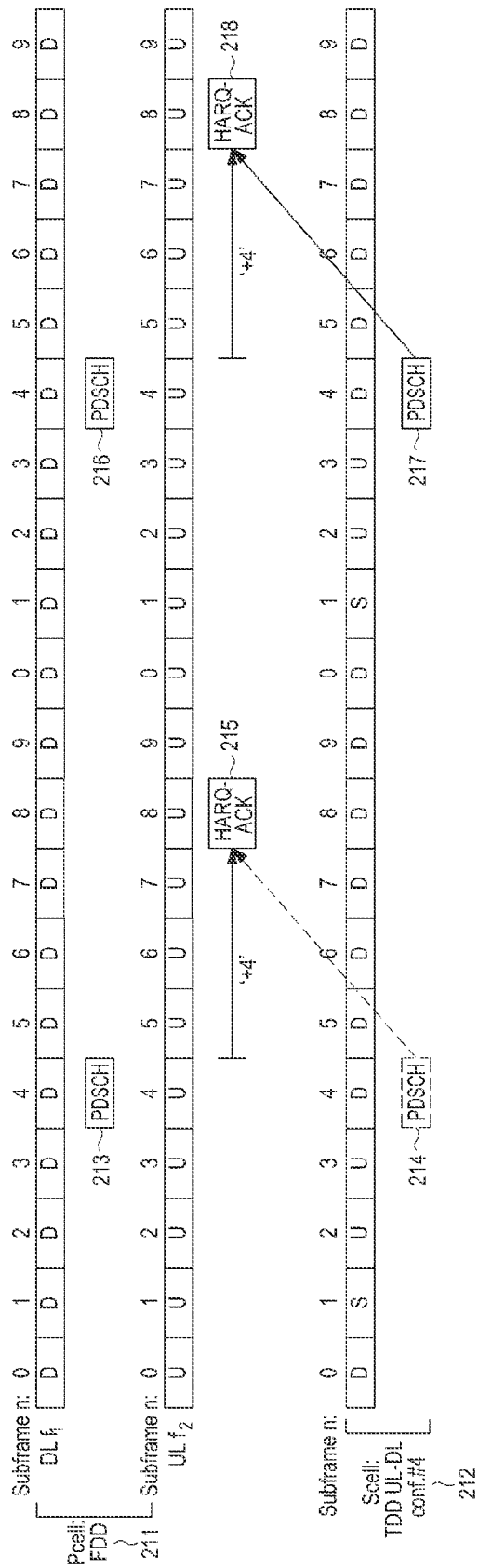
FIG. 2B illustrates a PUCCH transmission HARQ timing for PDSCHs transmitted in a primary cell (Pcell) and a Scell according to a second embodiment of the present disclosure.

FIG. 2B illustrates PUCCH transmission HARQ timing for PDSCHs transmitted in a Pcell and a Scell according to a second embodiment of the present disclosure.

Referring to FIG. 2B, in which control channel transmission using timing of an FDD cell is illustrated, a description will be made of a procedure for determining UL control channel transmission timing of an FDD cell to transmit an UL control channel for DL data of a TDD cell.

As illustrated in FIG. 2B, cells using different duplex schemes may be used for a UE. In FIG. 2B, a Pcell 211, hereinafter, referred to as an FDD cell 211, uses the FDD scheme, uses $f_1$ as a frequency for DL transmission, and uses $f_2$ as a frequency for UL transmission. A Scell 212, hereinafter, referred to as a 'TDD cell' 212, uses the TDD scheme and uses DL subframes and UL subframes that are configured according to, for example, the TDD UL-DL configuration #4.

If a PDSCH 217 is scheduled in a subframe #4 of the TDD cell 212, an HARQ-ACK 218, including an HARQ response with respect to the PDSCH 217, is transmitted four subframes after the subframe #4, that is, in an UL subframe #8 of the frequency $f_2$ of the FDD cell 211, according to UL control channel transmission timing of the FDD cell 211. If a PDSCH 216 of the FDD cell 211 is scheduled in the subframe #4, an HARQ response with respect to the PDSCH 216 is multiplexed and transmitted, together with the HARQ response with respect to the PDSCH 217, in the HARQ-ACK 218, four subframes after the subframe #4, that is, in the UL subframe #8 of the frequency $f_2$ of the FDD cell 211.

If a PDSCH 213 of the FDD cell 211 is scheduled in the subframe #4, an HARQ-ACK 215, including an HARQ response with respect to the PDSCH 213, is transmitted four frames after the subframe #4, that is, in the UL subframe #8 of the frequency $f_2$ of the FDD cell 211. In this case, it is assumed that a PDSCH 214 is not scheduled based on a determination of the BS. Thus, the HARQ-ACK 215 transmitted in the UL subframe #8 of the frequency $f_2$ of the FDD cell 211 includes DTX, which is an HARQ response with respect to the TDD cell 212, together with the HARQ response with respect to the PDSCH 213 of the FDD cell 211. That is, the HARQ response of the TDD cell 212 is limited to the DTX in a situation as illustrated in FIG. 2B.

Although it has been described with reference to FIG. 2B that a Pcell and a Scell have different duplex structures, the description of FIG. 2B is also applicable to a case where the Pcell and the Scell have the same duplex structure. The description of FIG. 2B is also applicable to a case where a Pcell and a Scell have a TDD structure as the same duplex structure and operate according to the same UL-DL configuration or different UL-DL configurations.

Figure 2C:
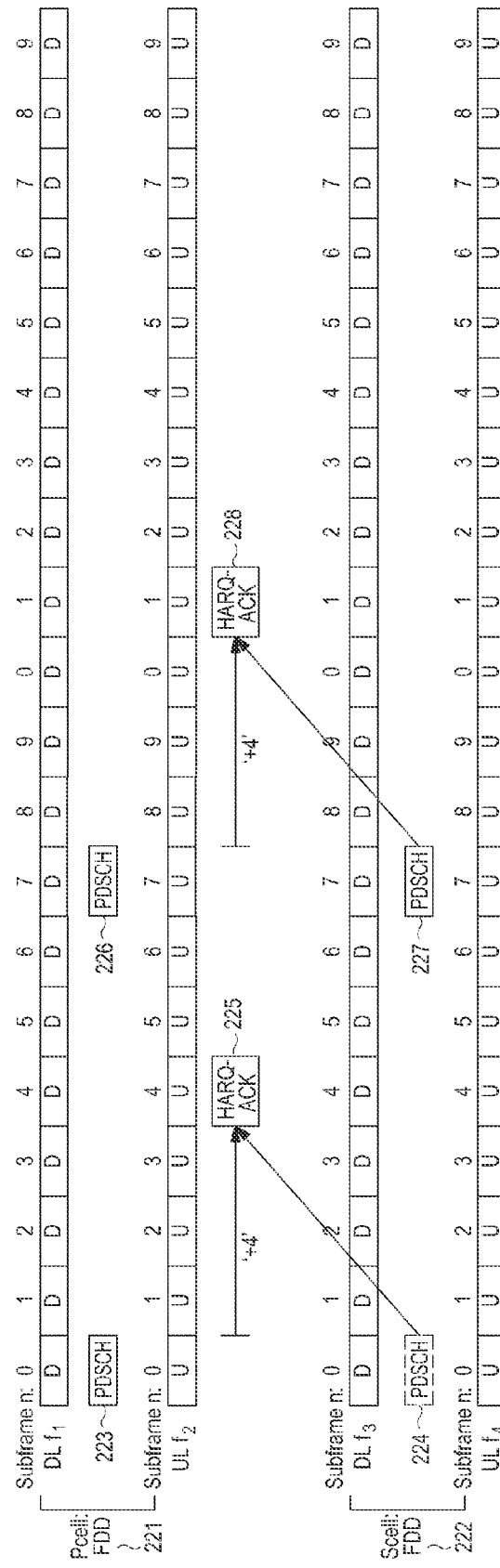
FIG. 2C illustrates PUCCH transmission HARQ timing for PDSCHs transmitted in a Pcell and a Scell according to a third embodiment of the present disclosure.

FIG. 2C illustrates PUCCH transmission HARQ timing for PDSCHs transmitted in a Pcell and a Scell according to a third embodiment of the present disclosure.

Referring to FIG. 2C, in which control channel transmission using timing of a Pcell when FDD cells are carrier-aggregated is illustrated, a description will be made of an operation of transmitting, in a Pcell, a UL control channel, that is, an HARQ response of a PUCCH, for DL data of the Pcell and a Scell.

Referring to FIG. 2C, a Pcell 221 and a Scell 222 configured in a UE through carrier aggregation (CA) use the same duplex scheme. That is, the Pcell 221 uses the FDD scheme, uses $f_1$ as a frequency for DL transmission, and uses $f_2$ as a frequency for UL transmission. The Scell 222 uses the FDD scheme, uses $f_3$ as a frequency for DL transmission, and uses $f_4$ as a frequency for UL transmission.

If a PDSCH 227 is scheduled in a subframe #7 of the Scell 222, an HARQ-ACK 228, including an HARQ response with respect to the PDSCH 227, is transmitted four subframes after the subframe #7, that is, in an UL subframe #1 of the frequency $f_2$ of the Pcell 221, according to UL control channel transmission timing of the Pcell 221. If a PDSCH 226 is scheduled in the subframe #7 in the Pcell 221, an HARQ response with respect to the PDSCH 226 is multiplexed and transmitted, together with the HARQ response with respect to the PDSCH 227, in the HARQ-ACK 228, four subframes after the subframe #7, that is, in an UL subframe #1 of the frequency $f_2$ of the Pcell 221.

If a PDSCH 223 of the Pcell 221 is scheduled in a subframe #0, an HARQ-ACK 225, including an HARQ response with respect to the PDSCH 223, is transmitted four subframes after the subframe #0, that is, in an UL subframe #4 of the frequency $f_2$ of the Pcell 221. In this case, it is assumed that a PDSCH 224 is not scheduled in a subframe #0 of the Scell 222 based on a determination of the BS. Thus, the HARQ-ACK 225 transmitted in the UL subframe #4 of the frequency $f_2$ of the Pcell 221 includes DTX, which is an HARQ response of the Scell 222, together with the HARQ response with respect to the PDSCH 223 of the Pcell 221. That is, in a situation as illustrated in FIG. 2C, the HARQ response of the Scell 222 is limited to the DTX.

Figure 2D:
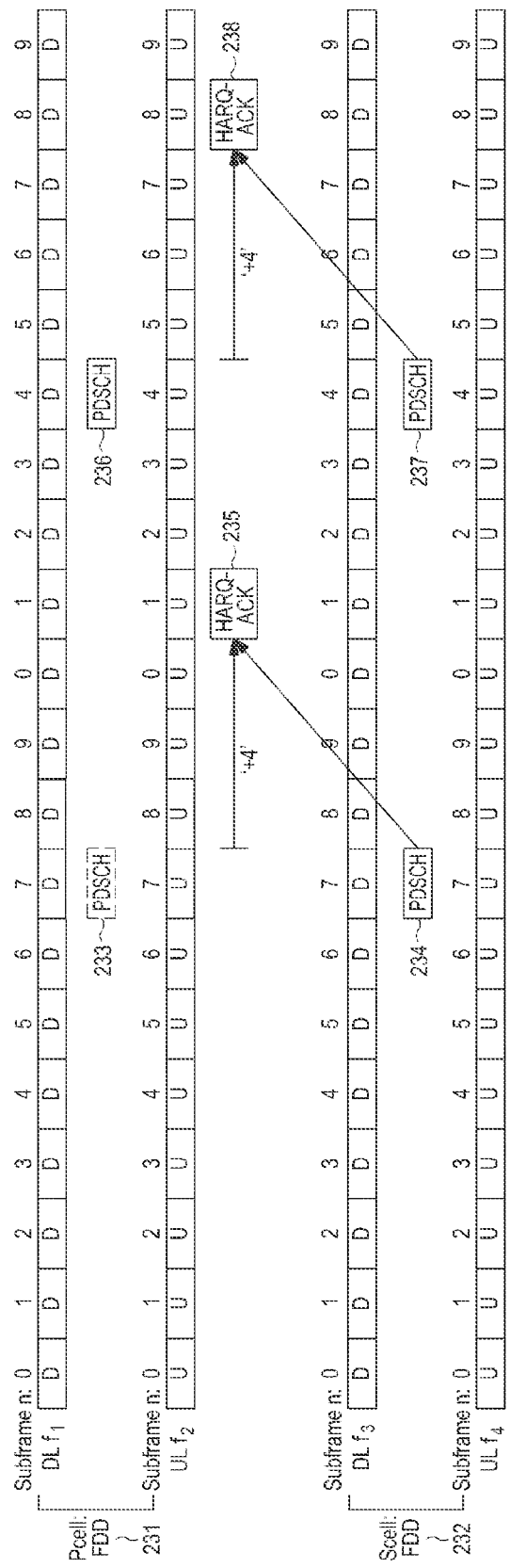
FIG. 2D illustrates PUCCH transmission HARQ timing for PDSCHs transmitted in a Pcell and a Scell according to a fourth embodiment of the present disclosure.

FIG. 2D illustrates PUCCH transmission HARQ timing for PDSCHs transmitted in a Pcell and a Scell according to a fourth embodiment of the present disclosure.

Referring to FIG. 2D, in which control channel transmission using timing of a Pcell when FDD cells are carrier-aggregated is illustrated, a description will be made of transmission of an UL control channel, that is, an HARQ response of a PUCCH, for DL data of a Pcell and a Scell in the Pcell.

Referring to FIG. 2D, a Pcell 231 and a Scell 232 configured in a UE through CA use the same duplex scheme. That is, the Pcell 231 uses the FDD scheme, uses $f_1$ as a frequency for DL transmission, and uses $f_2$ as a frequency for UL transmission. The Scell 232 uses the FDD scheme, uses $f_3$ as a frequency for DL transmission, and uses $f_4$ as a frequency for UL transmission.

If a PDSCH 237 is scheduled in a subframe #4 in the Scell 232, an HARQ-ACK 238, including an HARQ response with respect to the PDSCH 237, is transmitted four subframes after the subframe #4, that is, in an UL subframe #8 of the frequency $f_2$ of the Pcell 231, according to an UL control channel transmission timing of the Pcell 231. If a PDSCH 236 of the Pcell 231 is scheduled in a subframe #4, an HARQ response with respect to the PDSCH 236 is multiplexed and transmitted, together with the HARQ response with respect to the PDSCH 237, in the HARQ-ACK 238, four subframes after the subframe #4, that is, in the UL subframe #8 of the frequency $f_2$ of the Pcell 231.

If a PDSCH 234 of the Scell 232 is scheduled in a subframe #7, an HARQ-ACK 235 including an HARQ response with respect to the PDSCH 234 is transmitted four subframes after the subframe #7, that is, in an UL subframe #1 of the frequency $f_2$ of the Pcell 231. In this case, it is assumed that a PDSCH 233 is not scheduled in a subframe #7 of the Pcell 231 based on a determination of the BS. Thus, the HARQ-ACK 235 transmitted in the UL subframe #1 of the frequency $f_2$ of the Pcell 231 includes DTX, which is an HARQ response of the Pcell 231, together with the HARQ response with respect to the PDSCH 234 of the Scell 232. That is, in a situation as illustrated in FIG. 2D, an HARQ response of the Pcell 231 is limited to DTX.

Figure 2E:
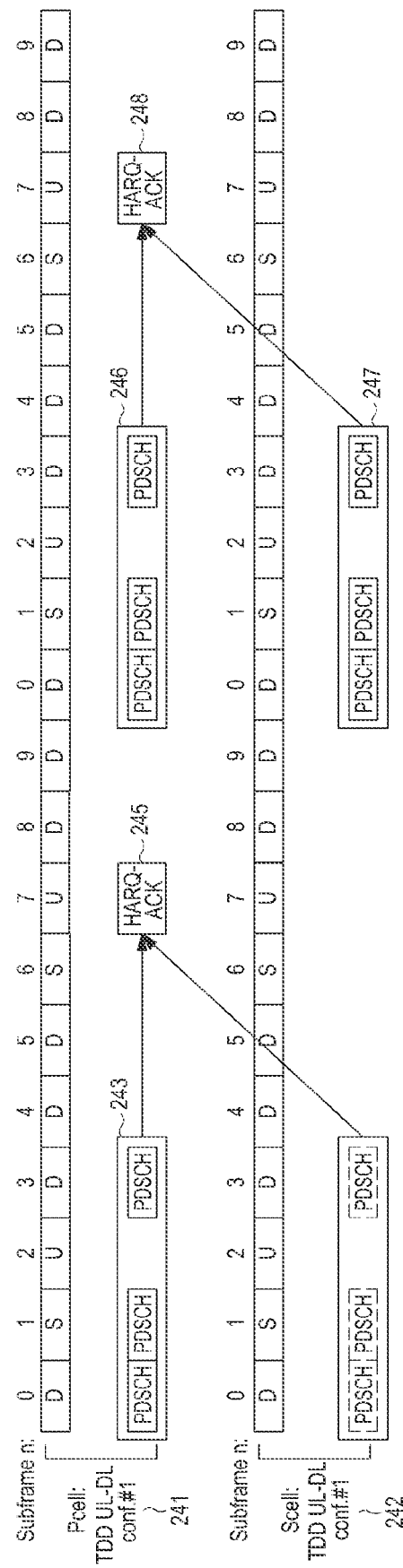
FIG. 2E illustrates PUCCH transmission HARQ timing for PDSCHs transmitted in a Pcell and a Scell according to a fifth embodiment of the present disclosure.

FIG. 2E illustrates PUCCH transmission HARQ timing for PDSCHs transmitted in a Pcell and a Scell according to a fifth embodiment of the present disclosure.

Referring to FIG. 2E, in which control channel transmission using timing of a Pcell when TDD cells are carrier-aggregated is illustrated, a description will be made of an operation of transmitting, in a Pcell, an UL control channel, that is, an HARQ response of a PUCCH, for DL data of the Pcell and a Scell.

Referring to FIG. 2E, a Pcell 241 and a Scell 242 configured in a UE through CA use the same duplex scheme. That is, the Pcell 241 uses the TDD scheme and uses DL subframes and UL subframes that are configured, for example, according to a TDD UL-DL configuration #1. The Scell 242 uses the TDD scheme and uses DL subframes and UL subframes that are configured, for example, according to the TDD UL-DL configuration #1.

If PDSCHs 247 are scheduled in subframes #0, #1, and #3 of the Scell 242, an HARQ-ACK 248, including HARQ responses with respect to the PDSCHs 247, is transmitted in an UL subframe #7 of the Pcell 241 according to UL control channel transmission timing of the TDD UL-DL configuration #1 of the Pcell 241. If PDSCHs 246 are scheduled in subframes #0, #1, and #3 in the Pcell 241, HARQ responses for the PDSCHs 246 are multiplexed and transmitted, together with the HARQ responses with respect to the PDSCHs 247 of the Scell 242, in the HARQ-ACK 248, in the UL subframe #7 of the Pcell 241, according to UL control channel transmission timing of the TDD UL-DL configuration #1 of the Pcell 241.

If PDSCHs 243 of the Pcell 241 are scheduled in subframes #0, #1, and #3, an HARQ-ACK 245 including HARQ responses with respect to the PDSCHs 243 is transmitted in the UL subframe #7 of the Pcell 241, according to UL control channel transmission timing of the TDD UL-DL configuration #1 of the Pcell 241. In this case, it is assumed that the PDSCH 244 is not scheduled in the subframes #0, #1, and #3 of the Scell 242 based on a determination of the BS. Thus, the HARQ-ACK 245 transmitted in the UL subframe #7 of the Pcell 241 includes DTX, which are HARQ responses of the Scell 242, together with the HARQ responses with respect to the PDSCHs 243 of the Pcell 241. In a situation as illustrated in FIG. 2E, the HARQ response of the Scell 242 is limited to the DTX.

Although it has been described with reference to FIG. 2E that a Pcell and a S cell have the TDD structure as the same duplex structure and operate according to the same UL-DL configuration, the description of FIG. 2E is also applicable to a case where the Pcell and the Scell operate according to different UL-DL configurations.

Figure 2F:
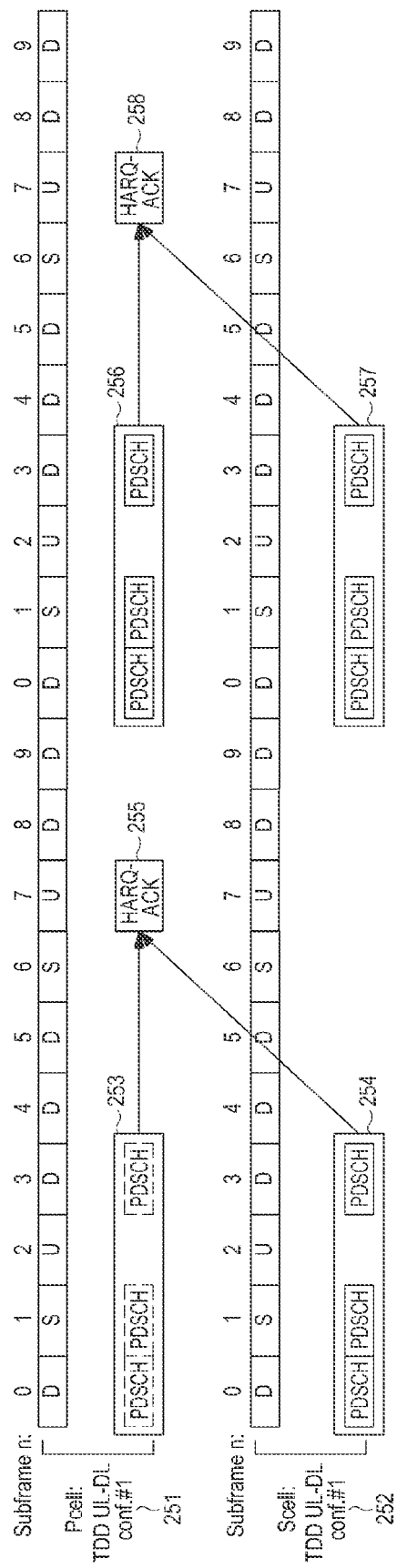
FIG. 2F illustrates PUCCH transmission HARQ timing for PDSCHs transmitted in a Pcell and a Scell according to a sixth embodiment of the present disclosure.

FIG. 2F illustrates PUCCH transmission HARQ timing for PDSCHs transmitted in a Pcell and a Scell according to a sixth embodiment of the present disclosure, in which control channel transmission using timing of a Pcell when TDD cells are carrier-aggregated is illustrated.

Referring to FIG. 2F, a description will be made of an operation of transmitting, in a Pcell, UL control channel (that is, an HARQ response of a PUCCH) for DL data of the Pcell and a Scell.

Referring to FIG. 2F, a Pcell 251 and a Scell 252 configured in a UE through CA use the same duplex scheme. That is, the Pcell 251 uses the TDD scheme and uses DL subframes and UL subframes that are configured, for example, according to the TDD UL-DL configuration #1. The Scell 252 uses the TDD scheme and uses DL subframes and UL subframes that are configured, for example, according to the TDD UL-DL configuration #1.

If PDSCHs 257 are scheduled in subframes #0, #1, and #3 of the Scell 252, an HARQ-ACK 258, including HARQ responses with respect to the PDSCHs 257, is transmitted in an UL subframe #7 of the Pcell 251, according to UL control channel transmission timing of the TDD UL-DL configuration #1 of the Pcell 251. If PDSCHs 256 are scheduled in subframes #0, #1, and #3 in the Pcell 251, HARQ responses with respect to the PDSCHs 256 are multiplexed and transmitted, together with the HARQ responses with respect to the PDSCHs 257 of the Scell 252, in the HARQ-ACK 258, in the UL subframe #7 of the Pcell 251, according to the UL control channel transmission timing of the TDD UL-DL configuration #1 of the Pcell 251.

If PDSCHs 254 of the Pcell 251 are scheduled in the subframes #0, #1, and #3, an HARQ-ACK 255 including HARQ responses to the PDSCHs 254 is transmitted in a UL subframe #7 of the Pcell 251 according to UL control channel transmission timing of the TDD UL-DL configuration #1 of the Pcell 251. It is assumed that PDSCHs 253 are not scheduled in the subframes #0, #1, and #3 of the Pcell 251 based on a determination of the BS. Thus, the HARQ-ACK 255 transmitted in the UL subframe #7 of the Pcell 251 includes DTX, which are HARQ responses of the Pcell 251, together with the HARQ responses with respect to the PDSCHs 254 of the Scell 252. That is, in a situation as illustrated in FIG. 2F, the HARQ responses of the Pcell 251 are limited to DTX.

Figure 2G:
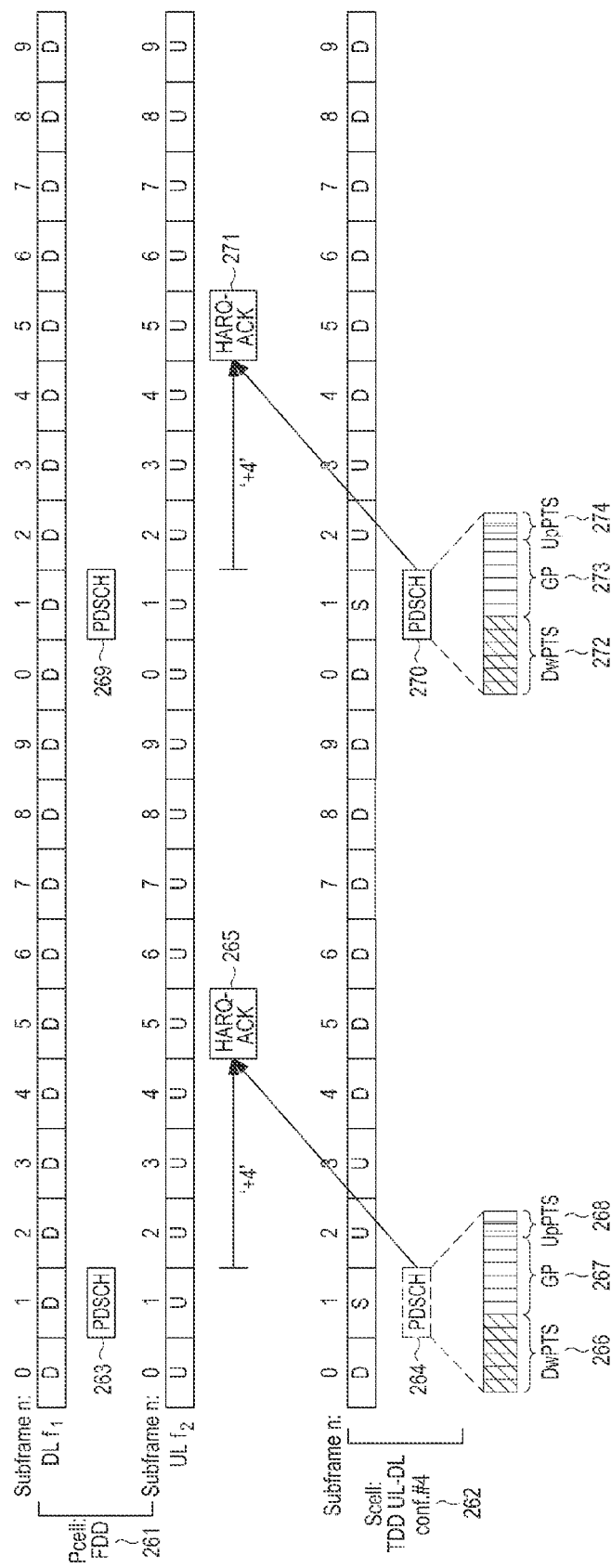
FIG. 2G illustrates PUCCH transmission HARQ timing for PDSCHs transmitted in a Pcell and a Scell according to a seventh embodiment of the present disclosure.

FIG. 2G illustrates PUCCH transmission HARQ timing for PDSCHs transmitted in a Pcell and a Scell according to a sixth embodiment of the present disclosure.

Referring to FIG. 2G, in which an embodiment of control channel transmission using timing of an FDD cell is illustrated, a description will be made of a procedure for determining UL control channel transmission timing of an FDD cell to transmit an UL control channel, that is, an HARQ response of a PUCCH, for DL data of a TDD cell.

As illustrated in FIG. 2G, cells using different duplex schemes may be configured for an UE. In FIG. 2G, a Pcell 261, hereinafter, referred to as an FDD cell 261, uses the FDD scheme, uses $f_1$ as a frequency for DL transmission, and uses $f_2$ as a frequency for UL transmission. A Scell 262, hereinafter, referred to as an TDD cell 262, uses the TDD scheme, and uses DL subframes and UL subframes that are configured, for example, according to a TDD UL-DL configuration #4. The UE obtains the DL frequency $f_1$ for the FDD cell 261 during cell search and obtains the UL frequency $f_2$ for the FDD cell 261 from system information received from the BS. The UE obtains information regarding a TDD UL-DL configuration of the TDD cell 262 through high layer signaling.

If a PDSCH 270 is scheduled in a subframe #1 of the TDD cell 262, an HARQ-ACK 271, including an HARQ response with respect to the PDSCH 270, is transmitted four subframes after the subframe #1, that is, in an UL subframe #5 of the frequency $f_2$ of the FDD cell 261, according to UL control channel transmission timing of the FDD cell 261. The subframe #1 of the TDD cell 262 is a special subframe, and includes DwPTS 272, GP 273, and UpPTS 274. The PDSCH 270 may be transmitted in the DwPTS 272 in the special subframe. If the length of the DwPTS 272 corresponding to a special subframe configuration is smaller than a data transmission-possible minimum length, for example, four OFDM symbols, the PDSCH 270 may not be transmitted. This is because 3 OFDM symbols in the DwPTS 272 are designated to carry the PDCCH.

If a PDSCH 269 of the FDD cell 261 is scheduled in a subframe #1, an HARQ response with respect to the PDSCH 269 is multiplexed and transmitted, together with the HARQ response with respect to the PDSCH 270 of the TDD cell 262, in the HARQ-ACK 271, four subframes after the subframe #1, that is, in an UL subframe #5 of the frequency $f_2$ of the FDD cell 261. The HARQ-ACK 271 may have a preset PUCCH format through high layer signaling.

If a PDSCH 263 of the FDD cell 261 is scheduled in a subframe #1, an HARQ-ACK 265, including an HARQ response with respect to the PDSCH 263, is transmitted four subframes after the subframe #1, that is, in an UL subframe #5 of a frequency $f_2$ of the FDD cell 261. It is assumed that a PDSCH 264 is not scheduled in the subframe #1 of the TDD cell 262 based on a determination of the BS. The subframe #1 of the TDD cell 262 is a special subframe, and includes DwPTS 266, GP 267, and UpPTS 268. Although the special subframe #1 is a subframe in which a PDSCH may be transmitted, the PDSCH 264 is not scheduled therein based on a determination of the BS, such that the PDSCH 264 is not transmitted in the DwPTS 266. Hence, the HARQ-ACK 265 transmitted in the UL subframe #5 of the frequency $f_2$ of the FDD cell 261 includes DTX, which is an HARQ response of the TDD cell 262, together with the HARQ response with respect to the PDSCH 263 of the FDD cell 261. That is, in a situation as illustrated in FIG. 2G, the HARQ response of the TDD cell 262 is limited to the DTX.

Although it has been described with reference to FIG. 2G that a Pcell and a Scell have different duplex structures, the description of FIG. 2G is also applicable to a case where the Pcell and the Scell have the same duplex structure. The description of FIG. 2G is also applicable to a case where a Pcell and a Scell have a TDD structure as the same duplex structure and operate according to the same UL-DL configuration or different UL-DL configurations.

Figure 2H:
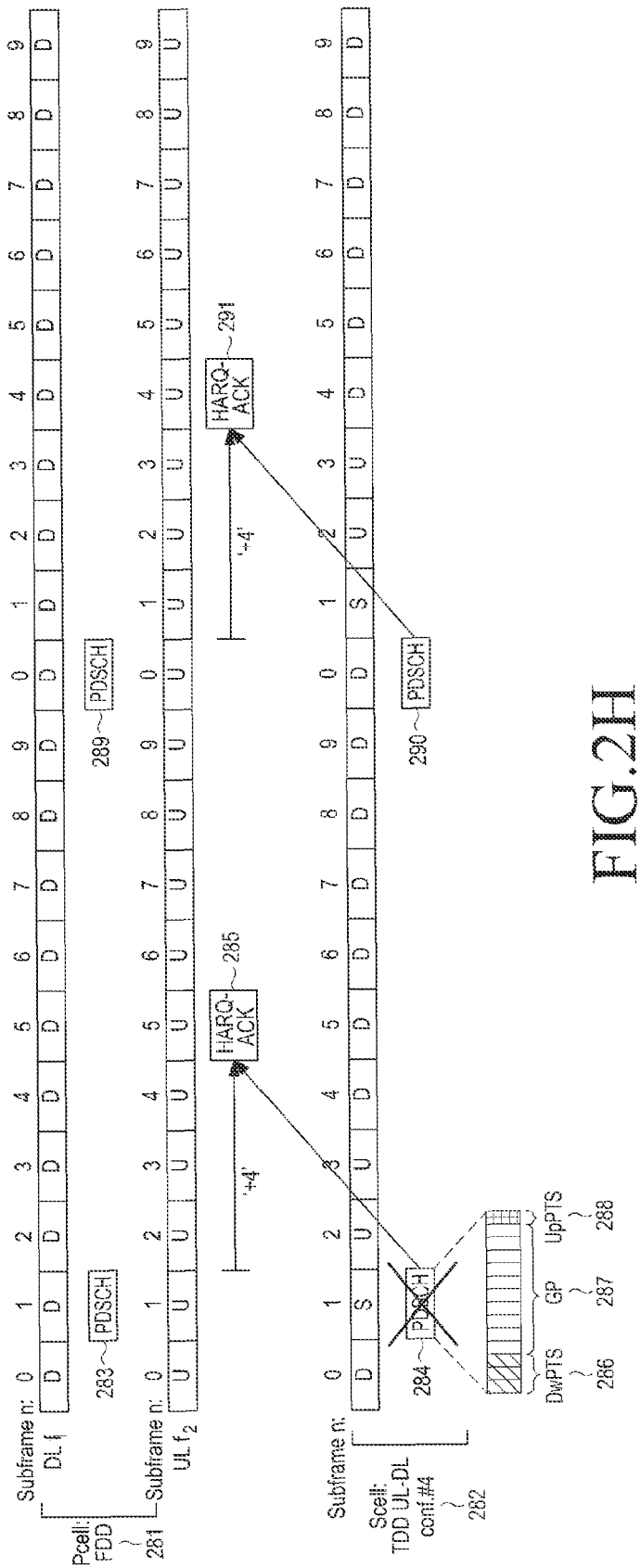
FIG. 2H illustrates PUCCH transmission HARQ timing for PDSCHs transmitted in a Pcell and a Scell according to an eighth embodiment of the present disclosure.

FIG. 2H illustrates PUCCH transmission HARQ timing for PDSCHs transmitted in a Pcell and a Scell according to an eighth embodiment of the present disclosure.

Referring to FIG. 2H, in which an embodiment of control channel transmission using timing of an FDD cell is illustrated, a description will be made of a procedure for determining UL control channel transmission timing of an FDD cell to transmit an UL control channel, that is, an HARQ response of a PUCCH, for DL data in a TDD cell.

As illustrated in FIG. 2H, a Pcell 281 and a Scell 282 using different duplex schemes may be configured for an UE. In FIG. 2H, the Pcell 281, hereinafter, referred to as an FDD cell 281, uses the FDD scheme, uses $f_1$ as a frequency for DL transmission, and uses $f_2$ as a frequency for UL transmission. The UE obtains the DL frequency $f_1$ for the FDD cell 281 during cell search and obtains the UL frequency $f_2$ for the FDD cell 281 from system information received from the BS. The UE may also obtain information regarding a TDD UL-DL configuration of the Scell 282, hereinafter referred to as a TDD cell 262, through high layer signaling. The TDD cell 282 may use DL subframes and UL subframes that are configured, for example, according to the TDD UL-DL configuration #4.

If a PDSCH 290 is scheduled in a subframe #0 of the TDD cell 282, an HARQ-ACK 291, including an HARQ response with respect to the PDSCH 290, is transmitted four frames after the subframe #0, that is, in an UL subframe #4 of a frequency $f_2$ of the FDD cell 281, according to UL control channel transmission timing of the FDD cell 281. If a PDSCH 289 of the FDD cell 281 is scheduled in a subframe #0, an HARQ response with respect to the PDSCH 289 is multiplexed and transmitted, together with the HARQ response with respect to the PDSCH 290, in the HARQ-ACK 291, four subframes after the subframe #0, that is, in the UL subframe #4 of the frequency $f_2$ of the FDD cell 281.

Next, a description will be made of a case where a PDSCH cannot be transmitted in a special subframe of the TDD cell 282. If a PDSCH 283 of the FDD cell 281 is scheduled in the subframe #1, an HARQ-ACK 285, including an HARQ response with respect to the PDSCH 283, is transmitted four subframes after the subframe #1, that is, in an UL subframe #5 of the frequency $f_2$ of the FDD cell 281. In this case, the subframe #2 of the TDD cell 282 is a special subframe, including a DwPTS 286, a TP 287, and a UpPTS 288, where the DwPTS 286 includes three OFDM symbols, such that a PDSCH 284 cannot be scheduled in the subframe #2 of the TDD cell 282. Thus, the HARQ-ACK 285 transmitted in the UL subframe #5 of the frequency $f_2$ of the FDD cell 281 includes DTX as an HARQ response of the TDD cell 282, together with the HARQ response with respect to the PDSCH 283 of the FDD cell 281. That is, in a situation as illustrated in FIG. 2H, the HARQ response of the TDD cell 282 is limited to the DTX.

Figure 2I:
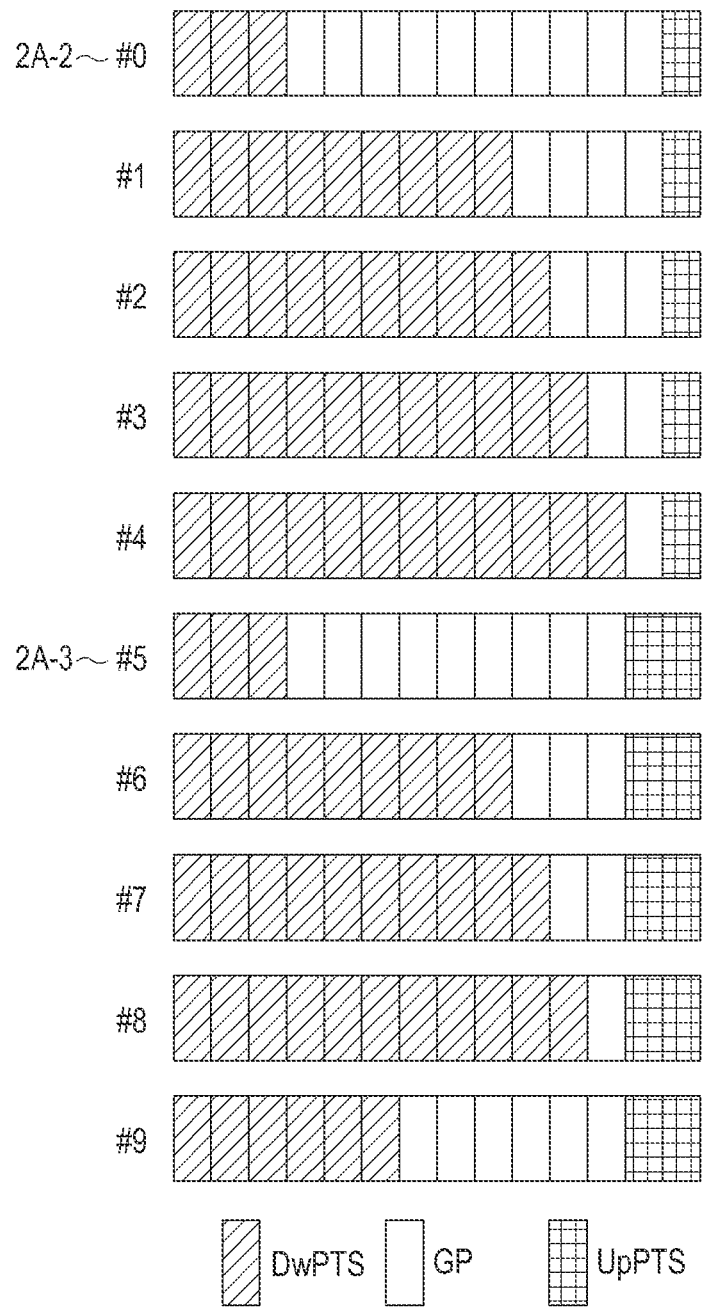
FIGS. 2I and 2J illustrate special subframe configurations according to an embodiment of the present disclosure.
Figure 2J:
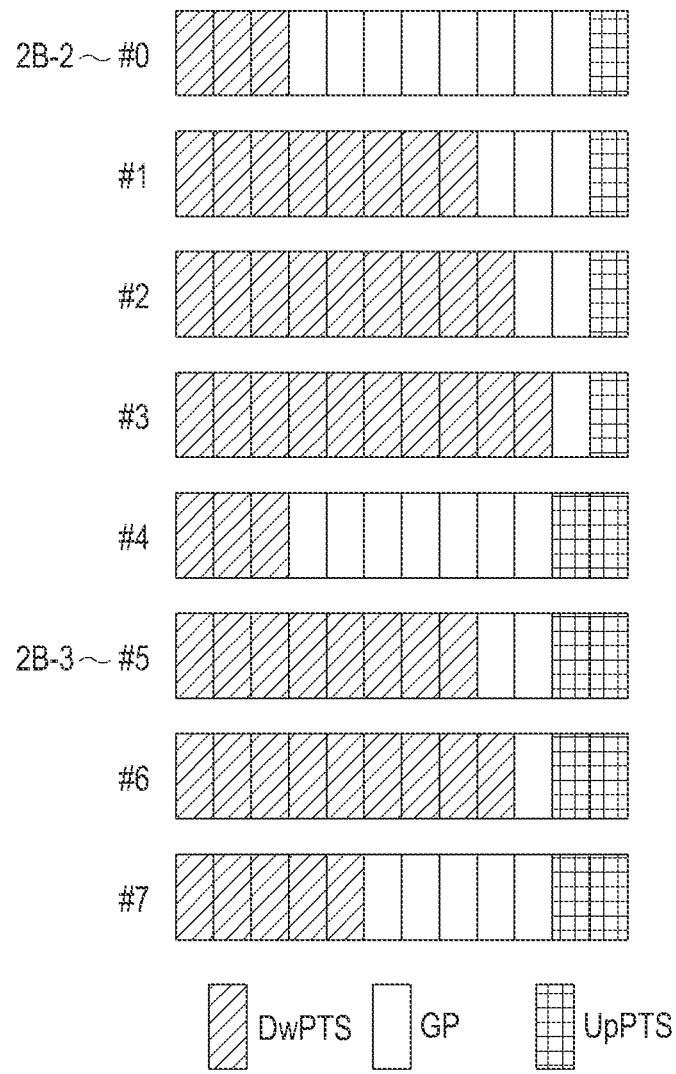

FIGS. 2I and 2J illustrate a special subframe configuration according to an embodiment of the present disclosure.

Referring to FIG. 2I, ten special subframe configurations for a normal cyclic prefix in a DL and an UL are illustrated, and referring to FIG. 2J, eight special subframe configurations for an extended cyclic prefix in a DL and an UL are illustrated. The type of a cyclic prefix applied in a DL may be recognized through decoding of a sync signal received by a UE from a cell.

Referring to FIG. 2I, in special subframe configurations 2A-1 supporting a normal cyclic prefix in a DL, a special subframe configuration #0 2A-2 and a special subframe configuration #5 2A-3 include DwPTS of three OFDM symbols and thus cannot transmit a PDSCH. Referring to FIG. 2J, in special subframe configurations 2B-1 supporting an extended cyclic prefix in a DL, a special subframe configurations #0 2B-2 and a special subframe configuration #4 2B-3 include DwPTS of three OFDM symbols and thus cannot transmit a PDSCH.

Thus, if a TDD cell supports a normal cyclic prefix in a DL, that is, has the special subframe configuration #0 2A-2 or the special subframe configuration #5 2A-3, an embodiment of FIG. 2H may be applied; otherwise, an embodiment of FIG. 2G may be applied. If a TDD cell supports an extended cyclic prefix in a DL, that is, has the special subframe configuration #0 2B-2 or the special subframe configuration #4 2B-3, an embodiment of 2H may be applied; otherwise, an embodiment of FIG. 2G may be applied.

FIG. 3A illustrates a PUCCH format used when an FDD Pcell and a TDD Scell are configured according to an embodiment of the present disclosure. The illustrated PUCCH format may be applied to a situation illustrated in FIG. 2A, FIG. 2B, FIG. 2G, or FIG. 2H.

Referring to an embodiment illustrated in FIG. 2A, a transmission mode for transmitting two codewords, i.e., a two-codeword transmission mode, may be set for the FDD cell 201 and the two-codeword transmission mode may be set for the TDD cell 202. The following description will be made of a case where a UE transmits a PUCCH by using "PUCCH format 1b with channel selection", but it may also be applied to cases where other PUCCH formats are used. In the subframe #7 of FIG. 2A, the PDSCH 206 and the PDSCH 207 are scheduled in the FDD cell 201 and the TDD cell 202, respectively, and the HARQ-ACK 208, including the HARQ responses with respect to the PDSCH 206 and the PDSCH 207, is transmitted four frames after the subframe #7, that is, in the UL subframe #1 of the frequency $f_2$ of the FDD cell 201. In this case, HARQ responses with respect to four codewords are mapped to results of decoding by the UE with respect to four codewords of the PDSCHs 206 and 207, by referring to a table shown in FIG. 3A.

Referring to the table shown in FIG. 3A, HARQ-ACK(0) and HARQ-ACK(1) indicate decoding results with respect to two codewords associated with a Pcell, that is, ACK or NACK/DTX (NACK or DTX), and HARQ-ACK(2) and HARQ-ACK(3) indicate decoding results with respect to two codewords associated with a Scell. In addition, $n_{PUCCH,i}^{(1)}$ (i=0, 1, 2, 3) represents an ith PUCCH resource for PUCCH Format 1, and b(0)b(1) represents bits mapped to HARQ responses corresponding to a plurality of codewords, which are bits of a HARQ-ACK actually delivered through corresponding PUCCH resources. A plurality of PUCCH resources $n_{PUCCH,i}^{(1)}$ (i=0, 1, 2, 3) are divided on the frequency axis in one subframe.

For example, if decoding results by the UE, with respect to two codewords transmitted in the FDD cell 201, are ACK and NACK/DTX and decoding results by the UE, with respect to two codewords transmitted in the TDD cell 202, are ACK and ACK, then the UE performs HARQ-ACK transmission by using a second row 301 of the table shown in FIG. 3A. That is, the UE performs transmission, mapping b(0)b(1)=0,1 onto a resource $n_{PUCCH,2}^{(1)}$. By detecting b(0)b(1)=0,1 from the resource $n_{PUCCH,2}^{(1)}$, the BS recognizes that the UE has transmitted ACK, NACK/DTX, ACK, and ACK with respect to a total of four codewords of the FDD cell 201 and the TDD cell 202.

A description will now be made of a situation where the PDSCH 203 is scheduled and transmitted in the subframe #2 of the FDD cell 201, and the PDSCH 204 is not transmitted in the subframe #2 of the TDD cell 202 which is an UL subframe. An HARQ-ACK 205, with respect to the PDSCHs 203 and 204, is transmitted four subframes after the subframe #2, that is, in the UL subframe #6 of the frequency $f_2$ of the FDD cell 201. HARQ responses with respect to two codewords transmitted in the FDD cell 201 may be mapped to ACK or NACK according to decoding results of the UE, but in the TDD cell 202, there is no PDSCH transmission and thus two HARQ responses with respect to PDSCH transmission for the TDD cell 202 may be mapped to DTX, respectively.

For example, if decoding results of the UE with respect to two codewords transmitted in the FDD cell 201 are ACK and NACK/DTX, HARQ responses, with respect to two codewords, that are not detected in the TDD cell 202 are set to DTX and DTX, respectively, and the UE performs HARQ-ACK transmission by using a fifth row 302 from bottom in the table shown in FIG. 3A. That is, the UE performs transmission, mapping b(0)b(1)=1,0 onto a resource $n_{PUCCH,0}^{(1)}$. By detecting b(0)b(1)=1,0 from the resource $n_{PUCCH,0}^{(1)}$, the BS recognizes that the UE has transmitted ACK, NACK/DTX, DTX, and DTX with respect to a total of four codewords of the FDD cell 201 and the TDD cell 202.

Herein, if a particular subframe of the TDD cell 202 is an UL subframe, both HARQ-ACK(2) and HARQ-ACK(3) need to be set to DTX in the table shown in FIG. 3A. If the subframe of the TDD cell 202 is an UL subframe, rows to which mapping is possible are limited to a block 303. Thus, if a subframe of a TDD cell is an UL subframe, only the resource $n_{PUCCH,0}^{(1)}$ is used without the use of $n_{PUCCH,1}^{(1)}$, $n_{PUCCH,2}^{(1)}$, and $n_{PUCCH,3}^{(1)}$.

To support transmission with a plurality of antenna ports for UL control channels having particular PUCCH formats, spatial orthogonal resource transmit diversity (SORTD) may be set. In this case, $n_{PUCCH,i}^{(1)}$ (i=0, 1, 2, 3) shown in FIG. 3A means resources on the first antenna port and in addition, resources $n_{PUCCH,i}^{(1)}$, on the second antenna port may be set. That is, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if a subframe of the TDD cell 202 is an UL subframe, $n_{PUCCH,0}^{(1)}$ and $n_{PUCCH,0}^{(1)}$, are used and the other resources are not used. If the number of UEs scheduled at the same time is large in a cell of the BS and a UL-DL configuration of a TDD cell includes many UL subframes, the amount of non-used resources increases among resources configured for the PUCCH format if the subframe of the TDD cell is an UL subframe.

As such, if the FDD cell is used as a Pcell, the TDD cell is used as a Scell by the BS, the UE uses the PUCCH format shown in FIG. 3A, and the subframe of the TDD cell is an UP subframe, then the other resources than the resource $n_{PUCCH,0}^{(1)}$ mapped to an HARQ-ACK for data delivered through the FDD cell may be used for PUSCH transmission or PUCCH transmission of one or more other UEs without system performance degradation. That is, the other resources may be used for PUSCH transmission or PUCCH transmission of the one or more other UEs without performance degradation that may be caused by the amount of transmission of the UE set for PUCCH transmission resources. If SORTD is set, the other resources other than $n_{PUCCH,0}^{(1)}$ and $n_{PUCCH,0}^{(1)}$, that are set through high layer signaling may be used for PUSCH transmission or PUCCH transmission of the one or more other UEs without system performance degradation, thereby improving the overall system performance.

While an embodiment of the present disclosure has been described using the table shown in FIG. 3A for application of "PUCCH format 1b with channel selection", when the two-codeword transmission mode is set for both the FDD Pcell and the TDD Scell, the embodiment illustrated in FIG. 3A may also be applied to other cases. For example, the embodiment illustrated in FIG. 3A may be applied to a case where a table for applying "PUCCH format 1b with channel selection" is used when the two-codeword transmission mode is set for one of the FDD Pcell and the TDD Scell, or a case where the table for applying "PUCCH format 1b with channel selection" is used when a transmission mode for transmitting one codeword, or a one-codeword transmission mode, is set for both the FDD Pcell and the TDD Scell.

If the FDD Pcell and the TDD Scell are configured according to the configuration of FIG. 2B, a PUCCH transmission scheme will be described with reference to FIG. 3A.

Referring to an embodiment of FIG. 2B, the two-codeword transmission mode is set for the FDD cell 211 and for the TDD cell 212. The following description will be made of a case where the UE transmits a PUCCH by using "PUCCH format 1b with channel selection", but the description may also be applied to cases where other PUCCH formats are used. In FIG. 2B, the PDSCH 216 and the PDSCH 217 are scheduled in the subframe #4 of the FDD cell 211 and the TDD cell 212, and the HARQ-ACK 218, including HARQ responses with respect to the PDSCH 216 and the PDSCH 217, is transmitted four subframes after the subframe #4, that is, in an UL subframe #8 of the frequency $f_2$ of the FDD cell 211. In this case, the HARQ responses with respect to the four codewords are mapped to decoding results of the UE with respect to the four codewords of the PDSCHs 216 and 217, by referring to the table shown in FIG. 3A.

For example, if decoding results by the UE with respect to two codewords transmitted in the FDD cell 211 are ACK and NACK/DTX and decoding results by the UE with respect to two codewords transmitted in the TDD cell 212 are ACK and ACK, then the UE performs HARQ-ACK transmission by using the second row 301 in the table shown in FIG. 3A. That is, the UE performs transmission, mapping b(0)b(1)=0,1 onto the resource $n_{PUCCH,2}^{(1)}$. By detecting b(0)b(1)=0,1 from the resource $n_{PUCCH,2}^{(1)}$, the BS recognizes that the UE has transmitted ACK, NACK/DTX, ACK, and ACK with respect to a total of four codewords of the FDD cell 211 and the TDD cell 212.

It is assumed that the PDSCH 213 is scheduled and transmitted in the subframe #4 of the FDD cell 211 and the PDSCH 214 is not scheduled in the subframe #4 of the TDD cell 212. The HARQ-ACK 215 with respect to the PDSCH 213 is transmitted four subframes after the subframe #4, that is, in the UL subframe #8 of the frequency $f_2$ of the FDD cell 211. The HARQ-ACK 215 with respect to two codewords transmitted in the FDD cell 211 may be mapped to ACK or NACK according to a decoding result of the UE, but in the TDD cell 212, there is no PDSCH transmission and thus two HARQ responses with respect to PDSCH transmission of the TDD cell 212 may be mapped to DTX, respectively.

For example, if decoding results of the UE are ACK and NACK/DTX with respect to two codewords transmitted in the FDD cell 211, HARQ responses with respect to two codewords that are not detected in the TDD cell 212 are set to DTX and DTX, and the UE performs HARQ-ACK transmission by using the fifth row 302 from bottom of the table shown in FIG. 3A. That is, the UE performs transmission, mapping b(0)b(1)=1,0 onto the resource $n_{PUCCH,0}^{(1)}$. By detecting b(0)b(1)=1,0 from the resource $n_{PUCCH,0}^{(1)}$, the BS recognizes that the UE has transmitted ACK, NACK/DTX, DTX, and DTX with respect to a total of four codewords of the FDD cell 211 and the TDD cell 212.

Herein, if there is no scheduling for DL data in a particular subframe of the TDD cell 212, that is, if there is no scheduled DL data transmission, HARQ-ACK(2) and HARQ-ACK(3) need to be set to DTX at all times in the table shown in FIG. 3A. Thus, rows to which mapping is possible in case of absence of scheduling for DL data in a subframe of the TDD cell 212 are limited by the block 303. Thus, in case of no scheduling for DL data in a subframe of the TDD cell 212, only the resource $n_{PUCCH,0}^{(1)}$ is used without the use of $n_{PUCCH,1}^{(1)}$, $n_{PUCCH,2}^{(1)}$, and $n_{PUCCH,3}^{(1)}$.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if there is no scheduling for DL data in a subframe of the TDD cell 212, $n_{PUCCH,0}^{(1)}$ and $n_{PUCCH,0}^{(1)}$, are used and the other resources are not used. If the number of UEs scheduled at the same time in a cell of the BS is large and the amount of data to be transmitted to the UEs is not large, the amount of non-used resources among resources configured for the PUCCH format increases further.

As such, if a Pcell and a Scell are configured by the BS and have different duplex structures or the same duplex structure, if a Pcell and a Scell have the TDD scheme as the same duplex structure and operate according the same UL-DL configuration or different UL-DL configurations, or if the UE uses the PUCCH format and there is no scheduling for DL data in the Pcell or the Scell, then the other resources than $n_{PUCCH,k}^{(1)}$, wherein k is a value among 0, 1, 2, and 3, may be used for PUSCH transmission or PUCCH transmission of other UEs without system performance degradation.

That is, the other resources may be used for PUSCH transmission or PUCCH transmission of other UE(s) without performance degradation corresponding to the amount of transmission of the UE that is set for corresponding PUCCH transmission. If SORTD is set, the other resources than $n_{PUCCH,k}^{(1)}$ and $n_{PUCCH,k}^{(1)}$, that is set through high layer signaling may be used for PUSCH transmission or PUCCH transmission of other UEs without system performance degradation, thereby improving system performance. Herein, k represents a resource index determined by mapping DTX to an HARQ response of a cell having no DL data scheduling. Referring to the table shown in FIG. 3A, if there is no DL data scheduling of the Scell, then a resource that needs to be used in mapping HARQ-ACKs of the Scell to DTX is $n_{PUCCH,0}^{(1)}$, and thus k is equal to 0, i.e., k=0.

Referring to the table shown in FIG. 3A, a description will be made of PUCCH transmission when an FDD Pcell and a TDD Scell are configured as in the embodiment of FIG. 2G.

Referring to an embodiment of FIG. 2G, the two-codeword transmission mode is set for the FDD cell 261 and for the TDD cell 262. The following description will be made of a case where the UE transmits a PUCCH by using "PUCCH format 1b with channel selection", but the description may also be applied to cases where other PUCCH formats are used. In FIG. 2G, the PDSCH 269 and the PDSCH 270 are scheduled in the subframes #1 of the FDD cell 261 and the TDD cell 262 and the HARQ-ACK 271, with respect to the PDSCH 269 and the PDSCH 270, is transmitted four subframes after the subframe #1, that is, in a UL subframe #5 of the frequency $f_2$ of the FDD cell 261. In this case, the HARQ-ACK 271 is mapped to decoding results by the UE with respect to four codewords of the PDSCHs 269 and 270.

For example, if decoding results by the UE with respect to two codewords transmitted in the FDD cell 261 are ACK and NACK/DTX and decoding results by the UE with respect to two codewords transmitted in the TDD cell 262 are ACK and ACK, then the UE performs HARQ-ACK transmission by using the second row 301 of the table shown in FIG. 3A. That is, the UE performs transmission, mapping b(0)b(1)=0,1 onto the resource $n_{PUCCH,2}^{(1)}$. By detecting b(0)b(1)=0,1 from the resource $n_{PUCCH,2}^{(1)}$, the BS recognizes that the UE has transmitted ACK, NACK/DTX, ACK, and ACK with respect to a total of four codewords of the FDD cell 261 and the TDD cell 262.

A description will be made of a situation where the PDSCH 263 is scheduled and transmitted in the subframe #1 of the FDD cell 261 and the PDSCH 264 is not scheduled in the subframe #1 of the TDD cell 262 based on a determination of the BS, that is, a determination that there is no PDSCH transmission. The HARQ-ACK 265, with respect to the PDSCHs 263 and 264, is transmitted four subframes after the subframe #1, that is, in a UL subframe #5 of the frequency $f_2$ of the FDD cell 261. The HARQ-ACK 265 with respect to two codewords transmitted in the FDD cell 261 may be mapped to ACK or NACK according to a decoding result of the UE, but there is no PDSCH transmission in the TDD cell 262 and thus two HARQ responses with respect to PDSCH transmission of the TDD cell 262 may be mapped to DTX, respectively.

For example, if decoding results by the UE with respect to two codewords transmitted in the FDD cell 261 are ACK and NACK/DTX, HARQ responses with respect to two codewords that are not detected in the TDD cell 262 are set to DTX and DTX, respectively, and the UE performs HARQ-ACK transmission by using the fifth row 302 from bottom in the table shown in FIG. 3A. That is, the UE performs transmission, mapping b(0)b(1)=1,0 onto a resource $n_{PUCCH,0}^{(1)}$. By detecting b(0)b(1)=1,0 from the resource $n_{PUCCH,0}^{(1)}$, the BS recognizes that the UE has transmitted ACK, NACK/DTX, DTX, and DTX with respect to a total of four codewords of the FDD cell 261 and the TDD cell 262.

Herein, if DL transmission is not scheduled in a particular subframe of the TDD cell 262, HARQ-ACK(2) and HARQ-ACK(3) need to be set to DTX at all times in the table shown in FIG. 3A. Thus, rows to which mapping is possible when there is no scheduling for DL data in a subframe of the TDD cell 262 are limited by the block 303. Thus, if there is no scheduling for DL data in a subframe of the TDD cell, only the resource $n_{PUCCH,0}^{(1)}$ is used without the use of $n_{PUCCH,1}^{(1)}$, $n_{PUCCH,2}^{(1)}$, and $n_{PUCCH,3}^{(1)}$.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if DL data transmission is not scheduled in a subframe of the TDD cell 262, the resources $n_{PUCCH,0}^{(1)}$ and $n_{PUCCH,0}^{(1)}$, are used and the other resources are not used. If the number of UEs scheduled at the same time in the cell of the BS is large and the amount of data to be transmitted to the UEs is not large, the amount of non-used resources among resources configured for the PUCCH format increases further.

As such, if a Pcell and a Scell are configured by the BS and have different duplex structures or the same duplex structure or if a Pcell and a Scell have the TDD scheme as the same duplex structure and uses the PUCCH format and there is no scheduling for DL data in the Pcell or the Scell, then the other resources, other than $n_{PUCCH,k}^{(1)}$, wherein k is a value among 0, 1, 2, and 3, may be used for PUSCH transmission or PUCCH transmission of other UEs without system performance degradation.

That is, the other resources may be used for PUSCH transmission or PUCCH transmission of the other UEs without performance degradation corresponding to the amount of transmission of the UE that is set for corresponding PUCCH transmission. If SORTD is set, the other resources, other than $n_{PUCCH,k}^{(1)}$ and $n_{PUCCH,k}^{(1)}$, that is set through high layer signaling, may be used for PUSCH transmission or PUCCH transmission of other UEs without system performance degradation, thereby improving system performance. Herein, k represents a resource index determined by mapping DTX to an HARQ response of a cell having no DL data scheduling. Referring to the table shown in FIG. 3A, if there is no DL data scheduling of the S cell, then a resource that needs to be used in mapping HARQ-ACKs of the Scell to DTX is $n_{PUCCH,0}^{(1)}$ and thus k is equal to 0.

With reference to FIG. 3A, a description will be made of a PUCCH transmission scheme when an FDD Pcell and a TDD Scell are configured according to a configuration illustrated in FIG. 2H.

In an embodiment illustrated in FIG. 2H, the two-codeword transmission mode is set for the FDD cell 281 and the two-codeword transmission mode is set for the TDD cell 282. The following description will be made of a case where "PUCCH format 1b with channel selection" is used, but it may also be applied to cases where other PUCCH formats are used. In the subframe #0 of FIG. 2H, the PDSCH 289 and the PDSCH 290 are scheduled in the FDD cell 281 and the TDD cell 282, respectively, and the HARQ-ACK 291, including the HARQ responses with respect to the PDSCH 289 and the PDSCH 290, is transmitted four frames after the subframe #0, that is, in the UL subframe #4 of the frequency $f_2$ of the FDD cell 281. In this case, HARQ responses with respect to the four codewords are mapped to results of decoding by the UE with respect to four codewords of the PDSCHs 289 and 290, by referring to the table shown in FIG. 3A.

For example, if decoding results by the UE with respect to two codewords transmitted in the FDD cell 281 are ACK and NACK/DTX and decoding results by the UE with respect to two codewords transmitted in the TDD cell 282 are ACK and ACK, then the UE performs HARQ-ACK transmission by using the second row 301 of the table shown in FIG. 3A. That is, the UE performs transmission, mapping b(0)b(1)=0,1 onto a resource $n_{PUCCH,2}^{(1)}$. By detecting b(0)b(1)=0,1 from the resource $n_{PUCCH,2}^{(1)}$, the BS recognizes that the UE has transmitted ACK, NACK/DTX, ACK, and ACK with respect to a total of four codewords of the FDD cell 281 and the TDD cell 282.

The PDSCH 283 is scheduled and transmitted in the subframe #1 of the FDD cell 281, and PDSCH transmission is not performed in the subframe #1 of the TDD cell 282, which is a special subframe where the DwPTS 286 includes three OFDM symbols. The HARQ-ACK 285 with respect to the PDSCH 283 is transmitted four subframes after the subframe #1, that is, in the UL subframe #5 of the frequency $f_2$ of the FDD cell 281. The HARQ-ACK 285 with respect to two codewords transmitted in the FDD cell 281 may be mapped to ACK or NACK according to decoding results by the UE, but in the TDD cell 282, there is no PDSCH transmission, and thus two HARQ responses with respect to PDSCH transmission of the TDD cell 282 may be mapped to DTX, respectively.

For example, if decoding results by the UE, with respect to two codewords transmitted in the FDD cell 281, are ACK and NACK/DTX, HARQ responses with respect to two codewords that are not detected in the TDD cell 282 are set to DTX and DTX, and the UE performs HARQ-ACK transmission by using the fifth row 302 from bottom of the table shown in FIG. 3A. That is, the UE performs transmission, mapping b(0)b(1)=1,0 onto $n_{PUCCH,0}^{(1)}$. By detecting b(0)b(1)=1,0 from the resource $n_{PUCCH,0}^{(1)}$, the BS recognizes that the UE has transmitted ACK, NACK/DTX, DTX, and DTX with respect to a total of four codewords of the FDD cell 281 and the TDD cell 282.

Herein, if a particular subframe of the TDD cell 281 is an UL subframe, both HARQ-ACK(2) and HARQ-ACK(3) need to be set to DTX in the table shown in FIG. 3A. If the subframe of the TDD cell 282 is a special subframe having a DwPTS with three OFDM symbols, rows to which mapping is possible are limited to the block 303. Thus, if the subframe of the TDD cell 282 is a special subframe having the DwPTS with three OFDM symbols, only the resource $n_{PUCCH,0}^{(1)}$ is used without the use of $n_{PUCCH,1}^{(1)}$, $n_{PUCCH,2}^{(1)}$, and $n_{PUCCH,3}^{(1)}$.

Meanwhile, if SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling in the table shown in FIG. 3A, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if a subframe of the TDD cell 282 is a special subframe having a DwPTS with three OFDM symbols, the resources $n_{PUCCH,0}^{(1)}$ and $n_{PUCCH,0}^{(1)}$, are used and the other resources are not used. If the number of UEs scheduled at the same time is large in a cell of the BS and a special subframe configuration of the TDD cell indicates a special subframe having the DwPTS with three OFDM symbols, then the amount of non-used resources increases among resources configured for the PUCCH format if the subframe of the TDD cell is a special subframe having the DwPTS with three OFDM symbols.

As such, if the FDD cell is used as a Pcell and the TDD cell is used as a Scell by the BS, the UE uses the PUCCH format shown in FIG. 3A, and the subframe of the TDD cell is a special subframe having the DwPTS with three OFDM symbols, then the other resources than the resource $n_{PUCCH,0}^{(1)}$ may be used for PUSCH transmission or PUCCH transmission of a UE without system performance degradation. That is, the other resources may be used for PUSCH transmission or PUCCH transmission of other UEs without performance degradation that may be caused by the amount of transmission of the UE set for PUCCH transmission resources. If SORTD is set, the other resources than $n_{PUCCH,0}^{(1)}$ and $n_{PUCCH,0}^{(1)}$, that is set through high layer signaling may be used for PUSCH transmission or PUCCH transmission of other UEs without system performance degradation, thereby improving system performance.

While an embodiment of the present disclosure has been described using the table shown in FIG. 3A for application of "PUCCH format 1b with channel selection" when the two-codeword transmission mode is set for both the FDD Pcell and the TDD Scell, an embodiment of FIG. 3A may also be applied to other cases. That is, the embodiment of FIG. 3A may be applied to a case where a table for applying "PUCCH format 1b with channel selection" is used when the two-codeword transmission mode is set for one of the FDD Pcell and the TDD Scell, or a case where the table for applying "PUCCH format 1b with channel selection" is used when the one-codeword transmission mode is set for both the FDD Pcell and the TDD Scell.

Although an embodiment of the present disclosure has been described using the table shown in FIG. 3A for application of "PUCCH format 1b with channel selection" when the two-codeword transmission mode is set for both the Pcell and the Scell, this embodiment may also be applied to other cases. That is, the described embodiment may also be applied to a case where the table for applying "PUCCH format 1b with channel selection" is used when the two-codeword transmission mode is set for one of the Pcell and the Scell or to a case where the table for applying "PUCCH format 1b with channel selection" is used when the one-codeword transmission mode is set for both the Pcell and the Scell.

FIGS. 3B and 3C illustrate PUCCH formats used when an FDD Pcell and a TDD Scell are configured according to an embodiment of the present disclosure.

Referring to FIG. 3B, a description will be made of PUCCH transmission if the FDD Pcell and the FDD Scell are configured according to an embodiment illustrated in FIG. 2C.

In an embodiment illustrated in FIG. 2C, the two-codeword transmission mode is set for the Pcell 221 and the two-codeword transmission mode is set for the Scell 222. The UE may perform PUCCH transmission based on a designated PUCCH format. The following description will be made based on a case where "PUCCH format 1b with channel selection" is used, but the description may also be applied to cases where other PUCCH formats are used. The PDSCH 226 and the PDSCH 227 are scheduled and transmitted in the subframe #7 of the Pcell 221 and the Scell 222 of FIG. 2C, and the HARQ-ACK 228, with respect to the PDSCH 226 and the PDSCH 227, is transmitted four subframes after the subframe #7, that is, in the subframe #1 of the frequency $f_2$ of the Pcell 221. In this case, the HARQ-ACK 228 is mapped to decoding results with respect to the PDSCHs 226 and 227.

For example, if decoding results by the UE with respect to two codewords transmitted in the Pcell 221 are ACK and NACK/DTX and decoding results by the UE with respect to two codewords transmitted in the Scell 222 are ACK and ACK, the UE performs HARQ-ACK transmission by using a second row 311 of the table shown in FIG. 3B. That is, the UE performs transmission, mapping b(0)b(1)=0,1 onto the resource $n_{PUCCH,2}^{(1)}$. By detecting b(0)b(1)=0,1 from the resource $n_{PUCCH,2}^{(1)}$, the UE recognizes that the UE has transmitted ACK, NACK/DTX, ACK, and ACK with respect to a total of four codewords of the Pcell 221 and the Scell 222.

It is assumed that the PDSCH 223 is not scheduled and transmitted in the subframe #0 of the Pcell 221 and the PDSCH 224 is not scheduled in the subframe #0 of the Scell 222 based on a determination of the BS. Thus, the HARQ-ACK 225 with respect to the PDSCHs 223 and 224 is transmitted four subframes after the subframe #0, that is, in the UL subframe #4 of the frequency $f_2$ of the Pcell 221. The HARQ-ACK 225 with respect to two codewords transmitted in the Pcell 221 may be mapped to ACK or NACK according to a decoding result by the UE, but two HARQ responses with respect to PDSCH transmission of the Scell 222 may be mapped to DTX.

For example, if decoding results by the UE with respect to two codewords transmitted in the Pcell 221 are ACK and NACK/DTX, HARQ responses with respect to two codewords that are not detected in the Scell 222 are set to DTX and DTX, and the UE performs HARQ-ACK transmission by using a fifth row 312 from bottom of the table shown in FIG. 3B. That is, the UE performs transmission, mapping b(0)b(1)=1,0 onto the resource $n_{PUCCH,0}^{(1)}$. By detecting b(0)b(1)=1,0 from the resource $n_{PUCCH,0}^{(1)}$, the BS recognizes that the UE has transmitted ACK, NACK/DTX, DTX, and DTX with respect to a total of four codewords of the Pcell 221 and the Scell 222.

Herein, if there is no scheduling for DL data in a particular subframe of the Scell 222, HARQ-ACK(2) and HARQ-ACK(3) need to be set to DTX at all times in the table shown in FIG. 3B. Thus, rows to which mapping is possible, when there is no scheduling for DL data in the subframe of the Scell 222, are limited by a block 313. If there is no scheduling for DL data in the subframe of the Scell 222, only the resource $n_{PUCCH,0}^{(1)}$ is used without the use of $n_{PUCCH,1}^{(1)}$, $n_{PUCCH,2}^{(1)}$, and $n_{PUCCH,3}^{(1)}$.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling in the table shown in FIG. 3B, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if there is no scheduling for DL data in the subframe of the Scell 222, $n_{PUCCH,0}^{(1)}$ and $n_{PUCCH,0}^{(1)}$, are used and the other resources are not used. If the number of UEs scheduled at the same time in a cell of the BS is large and the amount of data to be transmitted to the UEs is not large, the amount of non-used resources among resources configured for the PUCCH format increases further.

As such, if a Pcell and a Scell are configured by the BS and have the FDD structure as the same duplex structure, if the UE uses the PUCCH format and there is no scheduling for DL data in the Pcell or the Scell, then the other resources than $n_{PUCCH,k}^{(1)}$, wherein k is a value among 0, 1, 2, and 3, may be used for PUSCH transmission or PUCCH transmission of other UEs without system performance degradation. Herein, $n_{PUCCH,k}^{(1)}$ represents resources for mapping to DTX, HARQ-ACKs for a cell having no scheduling for DL data in a particular subframe.

That is, the other resources may be used for PUSCH transmission or PUCCH transmission of other UEs without performance degradation corresponding to the amount of transmission that is set for corresponding PUCCH transmission. If SORTD is set, the other resources, other than $n_{PUCCH,k}^{(1)}$, for mapping HARQ-ACKs for a cell having no scheduling to DTX in the table shown in FIG. 3B and $n_{PUCCH,k}^{(1)}$, that is set through high layer signaling may be used for PUSCH transmission or PUCCH transmission of other UEs without system performance degradation, thus improving system performance. Herein, k represents a resource index determined by mapping an HARQ response of a cell having no DL scheduling to DTX. Referring to the table shown in FIG. 3B, if there is no DL data scheduling of the Scell, a resource that needs to be used for mapping HARQ-ACKs of the Scell to DTX is $n_{PUCCH,0}^{(1)}$ and thus k is equal to 0.

While an embodiment of the present disclosure has been described using the table shown in FIG. 3B for application of "PUCCH format 1b with channel selection" when the two-codeword transmission mode is set for both the Pcell and the Scell, this embodiment may also be applied to other cases. That is, the described embodiment may be applied to a case where a table for applying "PUCCH format 1b with channel selection" is used when the two-codeword transmission mode is set for one of the Pcell and the S cell, or a case where the table for applying "PUCCH format 1b with channel selection" is used when the one-codeword transmission mode is set for both the Pcell and the Scell.

Referring to FIG. 3C, a description will be made of PUCCH transmission when an FDD Pcell and a TDD Scell are configured as in the embodiment of FIG. 2D.

Referring to the embodiment of FIG. 2D, the two-codeword transmission mode is set for the Pcell 231 and for the Scell 232. The following description will be made of a case where "PUCCH format 1b with channel selection" is used, but the description may also be applied to cases where other PUCCH formats are used. In FIG. 2D, the PDSCH 236 and the PDSCH 237 are scheduled and transmitted in the subframe #4 of the Pcell 231 and the Scell 232 and the HARQ-ACK 238 with respect to the PDSCHs 236 and 237 is transmitted four subframes after the subframe #4, that is, in the UL subframe #8 of the frequency $f_2$ of the Pcell 231. The HARQ-ACK 238 is mapped to decoding results with respect to four codewords of the PDSCHs 236 and 237 by referring to a table shown in FIG. 3C.

For example, if decoding results by the UE with respect to two codewords transmitted in the Pcell 231 are ACK and NACK/DTX and decoding results by the UE with respect to two codewords transmitted in the Scell 232 are ACK and ACK, the UE performs HARQ-ACK transmission by using a second row 321 of the table shown in FIG. 3C. That is, the UE performs transmission, mapping b(0)b(1)=0,1 onto $n_{PUCCH,2}^{(1)}$. By detecting (0)b(1)=0,1 from $n_{PUCCH,2}^{(1)}$, the BS recognizes that the UE has transmitted ACK, NACK/DTX, ACK, and ACK with respect to a total of four codewords of the Pcell 231 and the Scell 232.

It is assumed that the PDSCH 234 is scheduled and transmitted in the subframe #7 of the Scell 232 and the PDSCH 233 is not scheduled in the subframe #7 of the Pcell 231 based on a determination of the BS. The HARQ-ACK 235 with respect to the PDSCHs 234 and 233 is transmitted four subframes after the subframe #7, that is, in the UL subframe #1 of the frequency $f_2$ of the Pcell 231. The HARQ-ACK 235 with respect to two codewords transmitted in the Scell 232 may be mapped to ACK or NACK according to a decoding result by the UE, but in the Pcell 231, there is no PDSCH transmission, and thus two HARQ responses with respect to PDSCH transmission of the Pcell 231 may be mapped to DTX, respectively.

For example, if decoding results by the UE with respect to two codewords transmitted in the Scell 232 are ACK and NACK/DTX, HARQ responses with respect to two codewords that are not detected in the Pcell 231 are set to DTX and DTX, respectively, and the UE performs HARQ-ACK transmission by using an eighth row 322 from top of the table shown in FIG. 3C. That is, the UE performs transmission, mapping b(0)b(1)=1,0 onto the resource $n_{PUCCH,3}^{(1)}$. By detecting b(0)b(1)=1,0 from $n_{PUCCH,3}^{(1)}$, the BS recognizes that the UE has transmitted DTX, DTX, ACK, and NACK/DTX with respect to a total of four codewords of the Pcell 231 and the Scell 232.

Herein, if there is no scheduling with respect to DL data in a particular subframe of the Pcell 231, both HARQ-ACK (2) and HARQ-ACK(3) of the table shown in FIG. 3C need to be set to DTX. Thus, rows to which mapping is possible when there is no scheduling with respect to DL data in the particular subframe of the Pcell 231 are limited to a block 323. If there is no scheduling with respect to DL data in the particular subframe of the Pcell 231, only the resource $n_{PUCCH,3}^{(1)}$ is used without the use of $n_{PUCCH,0}^{(1)}$, $n_{PUCCH,1}^{(1)}$, and $n_{PUCCH,2}^{(1)}$.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling in the table shown in FIG. 3C, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if there is no scheduling with respect to DL data in the subframe of the Pcell 231, only the resources $n_{PUCCH,3}^{(1)}$ and $n_{PUCCH,3}^{(1)}$, are used, and the other resources are not used.

If the number of UEs scheduled at the same time in a cell of the BS is large and the amount of data to be transmitted to the UEs is not large, the amount of non-used resources out of resources configured for the PUCCH format increases further.

As such, if a Pcell and a Scell are configured by the BS and have the FDD scheme as the same duplex structure, or if the UE uses the PUCCH format and there is no scheduling for DL data in the Pcell or the Scell, then the other resources than $n_{PUCCH,k}^{(1)}$, wherein k is a value among 0, 1, 2, and 3, for mapping HARQ-ACKs to DTX may be used for PUSCH transmission or PUCCH transmission of other UEs without system performance degradation.

That is, the other resources may be used for PUSCH transmission or PUCCH transmission of other UEs without performance degradation corresponding to the amount of transmission of the UE set for corresponding PUCCH transmission. If SORTD is set, the other resources than $n_{PUCCH,k}^{(1)}$ for mapping HARQ-ACKs for a cell having no scheduling for DL data to DTX and $n_{PUCCH,k}^{(1)}$, that is set through high layer signaling may be used for PUSCH transmission or PUCCH transmission of other UEs without system performance degradation, thereby improving system performance. Herein, k represents a resource index determined by mapping HARQ-ACKs corresponding to a cell having no DL data scheduling to DTX according to a transmission mode of the cell. Referring to the table shown in FIG. 3C, if there is no DL data scheduling of the Pcell, then a resource that needs to be used in mapping HARQ-ACKs of the Pcell to DTX is $n_{PUCCH,3}^{(1)}$ and thus k is equal to 3, i.e., k=3.

While an embodiment of the present disclosure has been described using the table shown in FIG. 3C for application of "PUCCH format 1b with channel selection" when the two-codeword transmission mode is set for both the Pcell and the Scell, this embodiment may also be applied to other cases. For example, the embodiment described using the table shown in FIG. 3C may be applied to a case where a table for applying "PUCCH format 1b with channel selection" is used when the two-codeword transmission mode is set for one of the Pcell and the Scell, or a case where the table for applying "PUCCH format 1b with channel selection" is used when the one-codeword transmission mode is set for both the Pcell and the Scell.

FIGS. 3D and 3E illustrate PUCCH formats used when a TDD Pcell and a TDD Scell are configured according to an embodiment of the present disclosure.

Referring to FIG. 3D, a description will be made of PUCCH transmission when a TDD Pcell and a TDD Scell are configured according to the embodiment of FIG. 2E.

The UE performs PUCCH transmission based on a PUCCH format corresponding to the configuration of FIG. 2E. The following description will be made of a case where "PUCCH format 1b with channel selection" is used, but the description may also be applied to cases where other PUCCH formats are used. In FIG. 2E, PDSCHs 246 and PDSCHs 247 are scheduled and transmitted in subframes #0, #1, and #3 of the Pcell and the Scell 242 and the HARQ-ACK 248 with respect to the PDSCHs 246 and 247 is transmitted in the UL subframe #7 of the Pcell according to UL control channel transmission timing in the TDD UL-DL configuration #1 of the Pcell. In this case, the HARQ-ACK 248 is mapped to decoding results by the UE with respect to the PDSCHs 246 and 247. For convenience, it is assumed that a transmission mode of each TDD cell is set to a one-codeword transmission mode in the embodiment illustrated in FIG. 3D.

For example, if decoding results by the UE with respect to codewords transmitted in subframes #0, #1, and #3 of the Pcell 241 are ACK, NACK/DTX, and ACK and decoding results by the UE with respect to codewords transmitted in subframes #0, #1, and #3 of the Scell 242 are ACK, ACK, and ACK, the UE performs HARQ-ACK transmission by using a third row 331 of a table shown in FIG. 3D. That is, the UE performs transmission, mapping b(0)b(1)=1,1 onto the resource $n_{PUCCH,3}^{(1)}$. By detecting b(0)b(1)=1,1 from the resource $n_{PUCCH,3}^{(1)}$, the BS recognizes that the UE has transmitted ACK, NACK/DTX, any, ACK, ACK, and ACK with respect to the codewords in the subframes #0, #1, and #3 of the Pcell 241 and in the subframes #0, #1, and #3 of the Scell 242.

It is assumed that the PDSCHs 243 are scheduled and transmitted in the subframes #0, #1, and #3 of the Pcell 241 and the PDSCHs 244 are not scheduled in the subframes #0, #1, and #3 of the Scell 242 based on a determination of the BS. The HARQ-ACK 245 with respect to the PDSCHs 243 and 244 is transmitted in the UL subframe #7 of the Pcell according to UL control channel transmission timing in the TDD UL-DL configuration #1 of the Pcell. HARQ responses with respect to three codewords transmitted in the Pcell 241 may be mapped to ACK or NACK according to decoding results by the UE, but in the Scell 242, there is no PDSCH transmission and thus HARQ responses with respect to PDSCH transmission of the Scell 242 may be mapped to DTX.

For example, if decoding results by the UE with respect to codewords transmitted in the subframes #0, #1, and #3 of the Pcell 241 are ACK, NACK/DTX, and ACK, then HARQ responses with respect to the subframes #0, #1, and #3 of the Scell 242 are set to DTX, DTX, and DTX and the UE performs HARQ-ACK transmission by using a third row 332 from bottom of a table shown in FIG. 3D. That is, the UE performs transmission, mapping b(0)b(1)=1,1 onto the resource $n_{PUCCH,0}^{(1)}$. By detecting b(0)b(1)=1,1 from the resource $n_{PUCCH,0}^{(1)}$, the BS recognizes that the UE has transmitted ACK, NACK/DTX, any, NACK/DTX, any, and any with respect to codewords in the subframes #0, #1, and #3 of the Pcell 241 and the Scell 242 in order of the Pcell 241 and the Scell 242.

Herein, if there is no scheduling with respect to DL data in the subframes #0, #1, and #3 of the Scell 242, HARQ-ACK(i) corresponding to the Scell in the table shown in FIG. 3D needs to be set to DTX. Rows to which mapping is possible when there is no scheduling with respect to DL data in a particular subframe of the Scell 242 are limited to a block 333. Thus, if there is no scheduling with respect to DL data in the particular subframe of the Scell 242, only the resources $n_{PUCCH,0}^{(1)}$ and $n_{PUCCH,1}^{(1)}$ are used without the use of $n_{PUCCH,2}^{(1)}$ and $n_{PUCCH,3}^{(1)}$.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling in the table shown in FIG. 3D, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if there is no scheduling with respect to DL data in a subframe of the Scell 242, the resources $n_{PUCCH,0}^{(1)}$ and $n_{PUCCH,1}^{(1)}$ and the resources $n_{PUCCH,0}^{(1)}$, and $n_{PUCCH,1}^{(1)}$, are used, and the other resources are not used. If the number of UEs scheduled at the same time in a cell of the BS is large and the amount of data to be transmitted to the UEs is not large, the amount of non-used resources among resources configured for the PUCCH format increases further.

As such, if the Pcell and the Scell are configured by the BS and the Pcell and the Scell have the TDD structure as the same duplex structure, or if the UE uses the PUCCH format and there is no scheduling for DL data in the Pcell or the Scell, then the other resources than $n_{PUCCH,k}^{(1)}$, wherein k is a value among 0, 1, 2, and 3, and there may be a plurality of 'k's, for mapping a HARQ-ACKs for a cell having no scheduling to DTX may be used for PUSCH transmission or PUCCH transmission of other UEs without system performance degradation.

That is, the other resources may be used for PUSCH transmission or PUCCH transmission of other UEs without performance degradation corresponding to the amount of transmission of the UE set for corresponding PUCCH transmission. If SORTD is set, the other resources than $n_{PUCCH,k}^{(1)}$ for mapping HARQ-ACKs for a cell having no scheduling to DTX in the table shown in FIG. 3D and $n_{PUCCH,k}^{(1)}$, that is set through high layer signaling may be used for PUSCH transmission or PUCCH transmission of other UEs without system performance degradation, thus improving system performance. Herein, k represents a resource index determined by mapping an HARQ response of a cell having no DL scheduling to DTX. Referring to the table shown in FIG. 3D, if there is no DL data scheduling of the Scell, resources that need to be used for mapping HARQ-ACKs of the Scell to DTX are $n_{PUCCH,0}^{(1)}$ and $n_{PUCCH,1}^{(1)}$ and thus k is equal to 0 and 1, i.e., k=0, 1.

While the embodiment of the present disclosure has been described using the table shown in FIG. 3D for application of "PUCCH format 1b with channel selection" when codeword transmission is performed with respect to three subframes for the Pcell and the Scell, this embodiment may also be applied to other cases. For example, that embodiment may be applied to a case where a table for applying "PUCCH format 1b with channel selection" is used when codeword transmission is performed with respect to two subframes for the Pcell and the Scell, or a case where the table for applying "PUCCH format 1b with channel selection" is used when codeword transmission is performed with respect to four subframes for the Pcell and the Scell.

Referring to FIG. 3E, a description will be made of PUCCH transmission when a TDD Pcell and a TDD Scell are configured according to the embodiment of FIG. 2F. The following description will be made of a case where "PUCCH format 1b with channel selection" is used, but the description may also be applied to cases where other PUCCH formats are used.

Referring to FIG. 2F, the PDSCHs 256 and 257 are scheduled and transmitted in the subframes #0, #1, and #3 of the Pcell 251 and the Scell 252, the HARQ-ACK 258 with respect to the PDSCHs 256 and 257 is transmitted in the UL subframe #7 of the Pcell 251 according to UL control channel transmission timing in the TDD UL-DL configuration #1 of the Pcell 251. In this case, the HARQ-ACK 258 with respect to the PDSCHs 256 and 257 in respective subframes is mapped to a decoding result by the UE. For convenience, it is assumed that a transmission mode of each TDD cell is set to the one-codeword transmission mode in the embodiment illustrated in FIG. 3E.

For example, if decoding results by the UE with respect to codewords transmitted in the subframes #0, #1, and #3 of the Pcell 251 are ACK, NACK/DTX, and ACK and decoding results by the UE with respect to codewords transmitted in the subframes #0, #1, and #3 of the Scell 253 are ACK, ACK, and ACK, the UE performs HARQ-ACK transmission by using a third row 341 of the table shown in FIG. 3E. That is, the UE performs transmission, mapping b(0)b(1)= 1,1 onto the resource $n_{PUCCH,3}^{(1)}$. By detecting b(0)b(1)=1,1 from the resource $n_{PUCCH,3}^{(1)}$, the BS recognizes that the UE has transmitted ACK, NACK/DTX, any, ACK, ACK, and ACK with respect to codewords in the respective subframes #0, #1, and #3 of the Pcell 251 and the Scell 252.

It is assumed that the PDSCHs 254 are scheduled and transmitted in the subframes #0, #1, and #3 of the Scell 252 and the PDSCHs 253 are not scheduled in the subframes #0, #1, and #3 of the Pcell 251 based on a determination of the BS.

The HARQ-ACK 255 including HARQ responses with respect to the PDSCHs 253 and 254 is transmitted in the UL subframe #7 of the Pcell according to UL control channel transmission timing in the TDD UL-DL configuration #1 of the Pcell. HARQ responses with respect to three codewords transmitted in the Scell 252 may be mapped to decoding results by the UE, but two HARQ responses with respect to PDSCH transmission of the Pcell 251 may be mapped to DTX.

For example, if decoding results by the UE are ACK, NACK/DTX, and ACK with respect to codewords transmitted in the subframes #0, #1, and #3 of the Scell 252, HARQ responses with respect to codewords that are not detected in the subframes #0, #1, and #3 of the Pcell 251 are set to DTX, DTX, and DTX and the UE performs HARQ-ACK transmission by using a sixth row 342 from bottom of the table shown in FIG. 3E. That is, the UE performs transmission, mapping b(0)b(1)=0,0 onto the resource $n_{PUCCH,2}^{(1)}$. By detecting b(0)b(1)=0,0 from the resource $n_{PUCCH,2}^{(1)}$, the BS recognizes that the UE has transmitted NACK/DTX, any, any, ACK, NACK/DTX, and any with respect to codewords in the subframes #0, #1, and #3 of the Pcell 251 and the Scell 252

Herein, if there is no scheduling for DL data in the subframes #0, #1, and #3 of the Pcell 251, HARQ-ACK(i) corresponding to the Pcell 251 needs to be set to DTX at all times. Rows to which mapping is possible when there is no scheduling for DL data in the subframe of the Pcell 251 are limited to a block 343. Thus, if there is no scheduling for DL data in the subframe of the Pcell 251, only the resources $n_{PUCCH,2}^{(1)}$ and $n_{PUCCH,3}^{(1)}$ are used without the use of $n_{PUCCH,0}^{(1)}$ and $n_{PUCCH,1}^{(1)}$.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling in the table shown in FIG. 3E, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, if there is no scheduling for DL data in a subframe of the Pcell 251, the resources $n_{PUCCH,2}^{(1)}$ and $n_{PUCCH,3}^{(1)}$ and the resources $n_{PUCCH,2}^{(1)}$, and $n_{PUCCH,3}^{(1)}$, are used and the other resources are not used. If the number of UEs scheduled at the same time in a cell of the BS is large and the amount of data to be transmitted to the UEs is not large, the amount of non-used resources among resources configured for the PUCCH format increases further.

As such, if the Pcell and the Scell are configured by the BS and the Pcell and the Scell have the TDD structure as the same duplex structure, or if the UE uses the PUCCH format and there is no scheduling for DL data in the Pcell or the Scell, then the other resources than $n_{PUCCH,k}^{(1)}$, wherein k is a value among 0, 1, 2, and 3, and there may be a plurality of 'k's, for mapping a HARQ-ACKs for a cell having no scheduling to DTX may be used for PUSCH transmission or PUCCH transmission of other UEs without system performance degradation.

That is, the other resources may be used for PUSCH transmission or PUCCH transmission of other UEs without performance degradation corresponding to the amount of transmission of the UE that is set for corresponding PUCCH transmission. If SORTD is set, the other resources than $n_{PUCCH,k}^{(1)}$ for mapping HARQ-ACKs for a cell having no scheduling to DTX in the table shown in FIG. 3E and $n_{PUCCH,k}^{(1)}$, that is set through high layer signaling may be used for PUSCH transmission or PUCCH transmission of other UEs without system performance degradation, thereby improving system performance. Herein, k represents a resource index corresponding to resources for mapping HARQ-ACKs corresponding to a cell having no DL data scheduling to DTX. Referring to the table shown in FIG. 3E, if there is no DL data scheduling of the Pcell, then resources that need to be used in mapping HARQ-ACKs of the Pcell to DTX are $n_{PUCCH,2}^{(1)}$ and $n_{PUCCH,3}^{(1)}$, and thus k is equal to 2 and 3, i.e., k=2, 3.

While an embodiment of the present disclosure has been described using the table shown in FIG. 3E for application of "PUCCH format 1b with channel selection" when codeword transmission is performed with respect to three subframes for the Pcell and the Scell, this embodiment may also be applied to other cases. For example, the embodiment of FIG. 3E may be applied to a case where a table for applying "PUCCH format 1b with channel selection" is used when codeword transmission is performed with respect to two subframes in both the Pcell and the Scell, or a case where the table for applying "PUCCH format 1b with channel selection" is used when codeword transmission is performed for four subframes in both the Pcell and the Scell.

FIG. 3F illustrates a PUCCH format used when a PUCCH transmission resource is configured to be shared with a UE according to an embodiment of the present disclosure.

Referring to FIG. 3F, a description will be made of PUCCH transmission according to an embodiment of the present disclosure when a TDD Pcell and a TDD Scell are configured. The UEs may perform PUCCH transmission based on a predetermined PUCCH format. The following description will be made of a case where "PUCCH format 1b with channel selection" is used, but the description may also be applied to cases where other PUCCH formats are used.

In view of a system, a PUCCH transmission resource in a cell may be configured for multiple UEs. For example, a transmission resource shared between a UE 1 (not shown), which may be included in UEs that are not scheduled in a Scell, configured as shown in FIG. 2C and a UE 2 (not shown), which may be included in UEs that are not scheduled in a Pcell, configured as shown in FIG. 2D, may be configured. That is, the UE 1 uses only a resource $n_{PUCCH,0}^{(1)}$ 352 for HARQ-ACK transmission and UE 2 uses only a resource $n_{PUCCH,3}^{(1)}$ 351 for HARQ-ACK transmission. In this case, the BS may configure, among resources $n_{PUCCH,0}^{(1)}$, $n_{PUCCH,1}^{(1)}$, $n_{PUCCH,2}^{(1)}$, and $n_{PUCCH,3}^{(1)}$ to be configured for one UE, the resource $n_{PUCCH,0}^{(1)}$ for UE 1 and the resource $n_{PUCCH,3}^{(1)}$ for UE 2.

If SORTD is set, $n_{PUCCH,0}^{(1)}$, $n_{PUCCH,1}^{(1)}$, $n_{PUCCH,2}^{(1)}$, and $n_{PUCCH,3}^{(1)}$, are configured in the UE through high layer signaling in a table shown in FIG. 3F, in addition to $n_{PUCCH,0}^{(1)}$, $n_{PUCCH,1}^{(1)}$, $n_{PUCCH,2}^{(1)}$, and $n_{PUCCH,3}^{(1)}$. In this case, the BS may configure, among $n_{PUCCH,0}^{(1)}$, $n_{PUCCH,1}^{(1)}$, $n_{PUCCH,2}^{(1)}$, and $n_{PUCCH,3}^{(1)}$, to be configured for one UE, the resource $n_{PUCCH,0}^{(1)}$, for the UE 1 and the resource $n_{PUCCH,3}^{(1)}$, for the UE 2.

While an embodiment of the present disclosure has been described using the table shown in FIG. 3F for application of "PUCCH format 1b with channel selection" when the Pscell and the Scell are FDD cells and the two-codeword transmission mode is set for both the Pscell and the Scell, this embodiment may also be applied to other cases. For example, the embodiment of FIG. 3F may be applied to a case where a table for applying "PUCCH format 1b with channel selection" is used when the two-codeword transmission mode is set for one of the Pcell and the Scell, or a case where the table for applying "PUCCH format 1b with channel selection" is used when the one-codeword transmission mode is set for both the Pcell and the Scell. The described embodiment may also be applied to a case where the table for applying "PUCCH format 1b with channel selection" is used when both the Pcell and the Scell are TDD cells and codeword transmission is performed with respect to two, three, or four subframes in both the Pcell and the Scell.

Figure 4A:
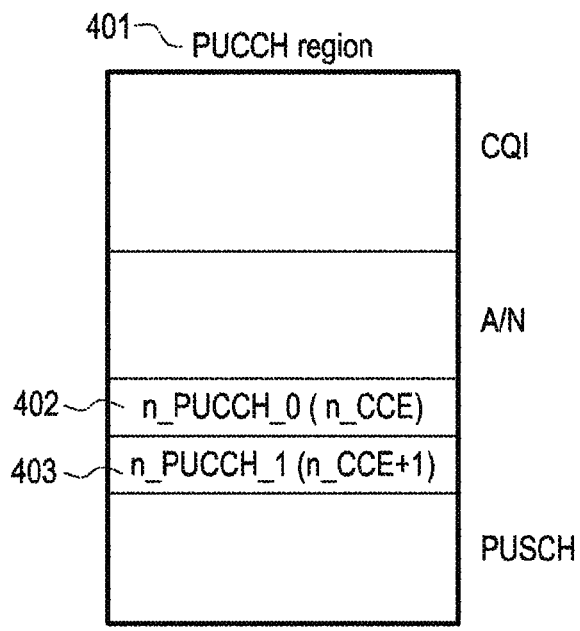
FIGS. 4A and 4B illustrate examples where a control channel transmission resource that has been configured for a particular terminal is used for other purposes according to an embodiment of the present disclosure.
Figure 4B:
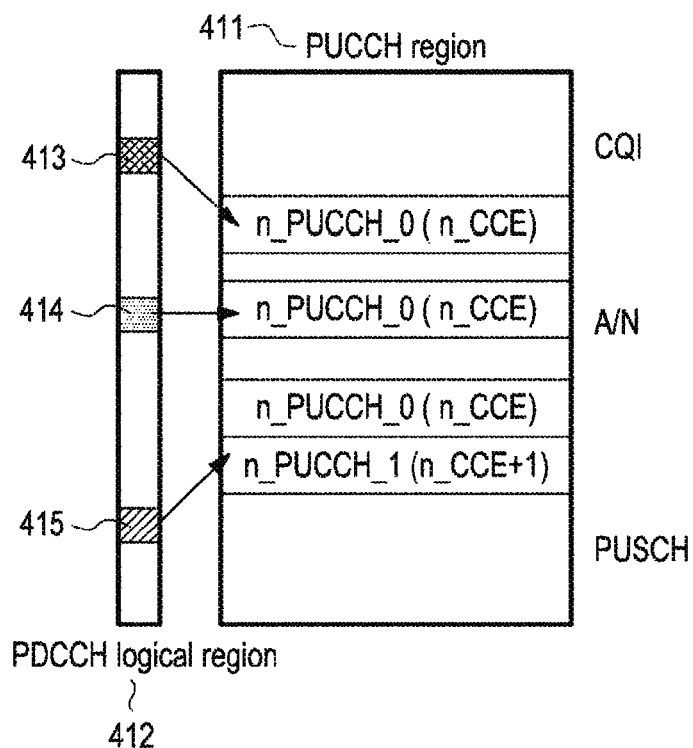

FIGS. 4A and 4B illustrate examples where a control channel transmission resource that has been configured for a particular terminal is used for other purposes according to an embodiment of the present disclosure.

Referring to FIGS. 4A and 4B, an embodiment using a PUCCH transmission resource, which has been configured for a particular UE, for other purposes will be described in detail.

Referring to FIGS. 4A and 4B, an example in which a BS according to an embodiment of the present disclosure uses a configured control channel transmission resource for other purposes when a subframe of a TDD Scell is an UP subframe, when a subframe of a TDD Scell is a special subframe in which PDSCH transmission is not possible, or when there is no data scheduling in a Pcell or a Scell, is illustrated.

Referring to FIG. 4A, a PUCCH region 401 includes $n_{PUCCH,0}^{(1)}$ 402 and $n_{PUCCH,1}^{(1)}$ 403 that are configured for PUCCH transmission of a particular UE. Herein, if a subframe of a TDD Scell is an UL subframe, the $n_{PUCCH,1}^{(1)}$ 403, except for the $n_{PUCCH,0}^{(1)}$ 402, may be used by the BS for PUSCH transmission of other UEs.

FIG. 4B illustrates a PUCCH region 411 configured for a particular UE and a PDCCH logical region 412 indicating a PDCCH control channel element (CCE) index determining a PUCCH resource. Referring to FIG. 4B, if a subframe of a TDD Scell is an UL subframe, PDCCHs 413, 414, and 415 for the other UEs are transmitted by the BS so that $n_{PUCCH,1}^{(1)}$, $n_{PUCCH,2}^{(1)}$, and $n_{PUCCH,3}^{(1)}$, except for $n_{PUCCH,0}^{(1)}$, may be used for PUCCH transmission of the other UEs.

Figure 5A:
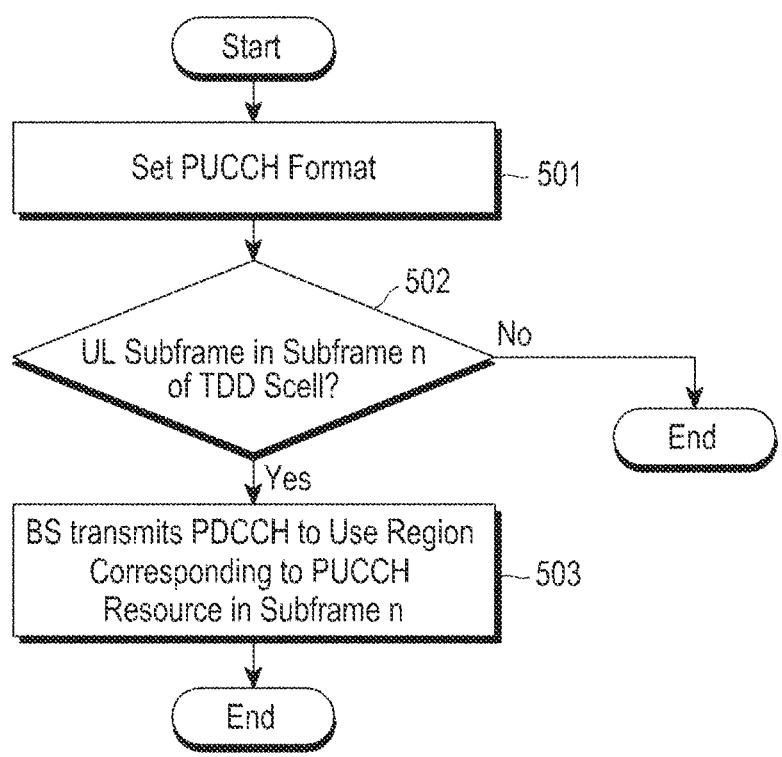
FIG. 5A is a flowchart illustrating base station (BS) operations for resource allocation according to an embodiment of the present disclosure.

FIG. 5A is a flowchart illustrating operations of a BS for resource allocation according to an embodiment of the present disclosure. The operations of the illustrated flowchart may be performed, for example, for the UE configured as illustrated in FIG. 2A.

Referring to FIG. 5A, a BS configures CA having different duplex modes for a UE, or in other words, sets a PUCCH format, in operation 501. The BS additionally configures a TDD Scell for the UE having a FDD Pcell, and as a PUCCH transmission format for the UE, for example, "PUCCH format 1b with channel selection" may be set.

In operation 502, the BS determines whether a UL subframe is in a subframe n of the TDD Scell. If the UL subframe is in the subframe n of the TDD Scell, or in other words, if the subframe n of the TDD Scell is the UL subframe, the process proceeds to operation 503. In operation 503, the BS determines to use, for a PUSCH transmission or a PUCCH transmission of another UE, a region corresponding to the other PUCCH resources than $n_{PUCCH,0}^{(1)}$, for SORTD $n_{PUCCH,0}^{(1)}$ and $n_{PUCCH,0'}^{(1)}$, configured for "PUCCH format 1b with channel selection" in the subframe n, and, if the other PUCCH resources are allocated to a PUSCH or a PUCCH for another UE, the BS transmits a PDCCH to use a region corresponding to the PUCCH resource in subframe n, or in other words, for scheduling a PUSCH or a PDCCH for scheduling a PUCCH to the UE.

Figure 5B:
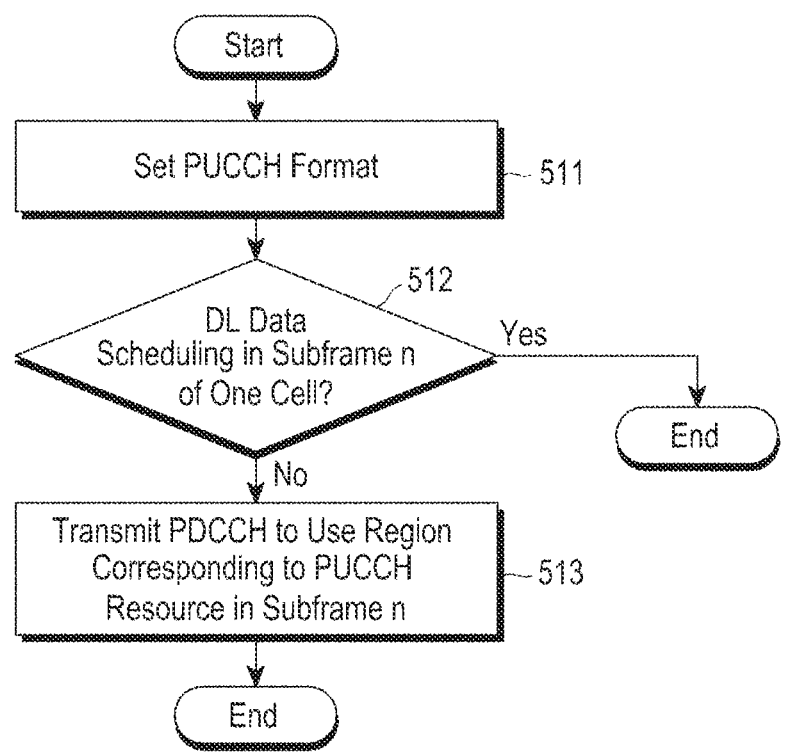
FIG. 5B is a flowchart illustrating BS operations for resource allocation according to another embodiment of the present disclosure.

FIG. 5B is a flowchart illustrating operations of a BS for resource allocation according to another embodiment of the present disclosure. The operations of the illustrated flowchart may be performed, for example, for the UE configured as illustrated in FIGS. 2B to 2G.

Referring to FIG. 5B, a BS configures CA having different duplex modes or the same duplex mode for a UE, or in other words, a PUCCH format is set, in operation 511. Herein, the BS additionally configures a Scell for a UE having a Pcell and sets, for example, "PUCCH format 1b with channel selection" as a PUCCH transmission format for the UE.

The BS determines whether DL transmission is scheduled in a subframe n of one of the Pcell and the Scell, or in other words, determines whether there is DL data scheduling in subframe n of one cell, in operation 512, and if there is no DL data scheduling, the BS proceeds to operation 513. In operation 513, the BS determines to use, for PUSCH transmission or PUCCH transmission of another UE, a region corresponding to the PUCCH resources other than $n_{PUCCH,k}^{(1)}$, for SORTD, $n_{PUCCH,k}^{(1)}$ and $n_{PUCCH,k'}^{(1)}$, configured for "PUCCH format 1b with channel selection" in the subframe n, or in other words, transits a PDCCH to use a region corresponding to the PUCCH resource in the subframe n. If the other PUCCH resources are allocated to a PUSCH or a PUCCH for another UE, the BS transmits a PDCCH for scheduling a PUSCH or a PDCCH for scheduling a PUCCH to the UE.

Figure 5C:
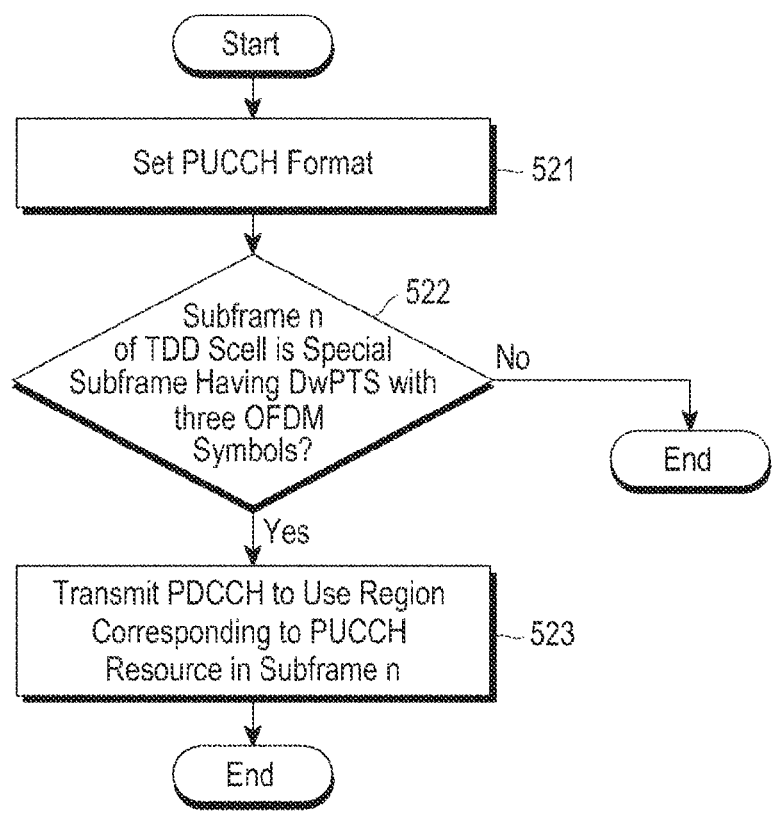
FIG. 5C is a flowchart illustrating BS operations for resource allocation according to another embodiment of the present disclosure.

FIG. 5C is a flowchart illustrating operations of a BS for resource allocation according to another embodiment of the present disclosure. The operations of the illustrated flowchart may be performed, for example, with respect to the UE as illustrated in FIG. 2H.

Referring to FIG. 5C, a BS configures CA having different duplex modes or the same duplex mode for a UE, or in other words, sets a PUCCH format, in operation 521. The BS additionally configures a Scell for a UE having a Pcell and sets, for example, "PUCCH format 1b with channel selection" as a PUCCH transmission format for the UE through high layer signaling.

The BS determines whether a subframe n of the TDD Scell is a special subframe having DwPTS with three OFDM symbols in operation 522, and if the subframe n is the special subframe, the BS proceeds to operation 523. The determination of operation 522 may be made when a special subframe configuration is transmitted to the UE or when the special subframe configuration is determined by the BS. In operation 523, the BS determines to use, for PUSCH transmission or PUCCH transmission of another UE, a region corresponding to the other PUCCH resources than $n_{PUCCH,0}^{(1)}$, for SORTD, $n_{PUCCH,0}^{(1)}$ and $n_{PUCCH,0'}^{(1)}$, configured for "PUCCH format 1b with channel selection" in the subframe n, or in other words, transmits a PDCCH to use a region corresponding to a PUCCH resource in subframe n. If the other PUCCH resources are allocated to a PUSCH or a PUCCH for another UE, the BS transmits a PDCCH for scheduling a PUSCH or a PDCCH for scheduling a PUCCH to the UE.

Figure 6:
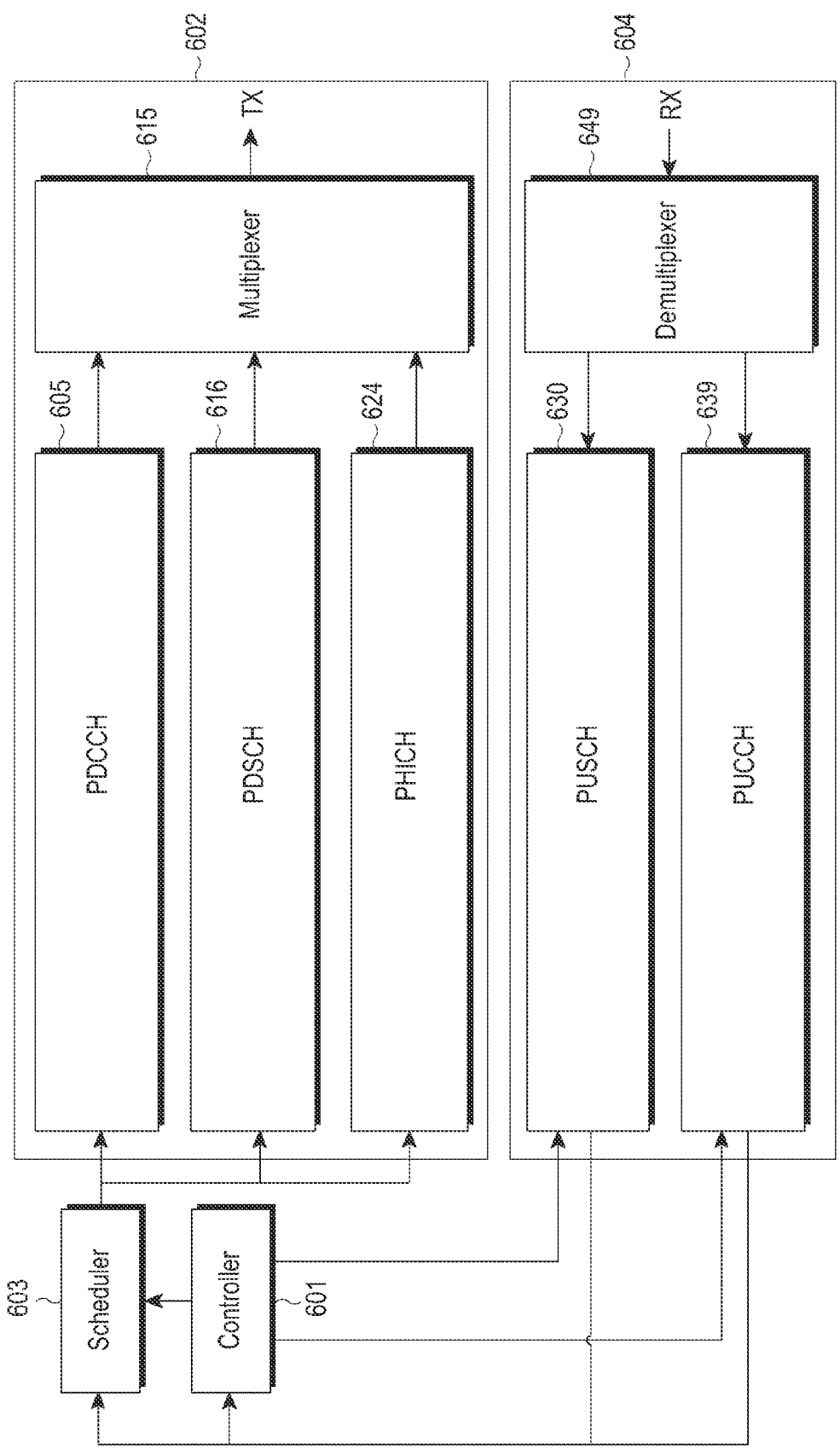
FIG. 6 is a block diagram of a BS according to an embodiment of the present disclosure.

FIG. 6 is a block diagram of a BS according to an embodiment of the present disclosure.

Referring to FIG. 6, the BS may include a transmitter 602, a receiver (RX) 604, a controller 601, and a scheduler 603. The transmitter 602 may include a PDCCH block 605, a PDSCH block 616, a physical hybrid-ARQ indicator channel (PHICH) block 624, and a multiplexer 615. The receiver 604 may include a PUSCH block 630, a PUCCH block 639, and a demultiplexer 649. The controller 601 controls DL/UL HARQ-ACK transmission and reception timing and controls using a PUCCH transmission resource, which has been configured for a particular UE, for other purposes.

Herein, the DL/UL HARQ-ACK transmission and reception timing may include PUCCH transmission timing for PDSCH transmission and PUSCH timing for PDCCH transmission. The controller 601 manages operations of the BS according to an embodiment of the present disclosure. For transmission and reception in multiple cells, multiple transmitters and multiple receivers, except for a PUCCH block, may exist, but for convenience, a description will be made using an example where one transmitter and one receiver exist.

The controller 601 controls a timing relationship between physical channels for a UE to be scheduled, by referring to the amount of data to be transmitted to the UE and the amount of resources available in the system, and controls the scheduler 603, the PDCCH block 605, the PDSCH block 616, the PHICH block 624, the PUSCH block 630, and the PUCCH block 639. The DL/UL HARQ-ACK transmission and reception timing and the operation of using the PUCCH transmission resource, which have been configured for a particular UE, for other purposes follow the above-described embodiments. The PDCCH block 605 configures control information to use a PUCCH transmission resource, which has been configured for a particular UE, for other purposes under control of the scheduler 603, and the control information is multiplexed together with other signals in the multiplexer 615.

The PDSCH block 616 generates data under control of the scheduler 603, and the data is multiplexed together with other signals in the multiplexer 615.

The PHICH block 624 generates a HARQ ACK/NACK with respect to a PUSCH received from the UE under control of the scheduler 603. The HARQ ACK/NACK is multiplexed together with other signals in the multiplexer 615.

The multiplexed signals are generated into an OFDM signal, which is then transmitted to the UE.

In the receiver 604, the demultiplexer 649 demultiplexes a received signal for distribution to the PUSCH block 630 and the PUCCH block 639. The PUSCH block 630 obtains PUSCH data with respect to the signal received from the UE, notifies the scheduler 603 of a decoding result with respect to the PUSCH data to control generation of DL HARQ ACK/NACK, and delivers the decoding result to the controller 601 in charge of control of DL/UL HARQ-ACK transmission and reception timing to control DL HARQ ACK/NACK transmission timing.

The PUCCH block 630 obtains UL ACK/NACK or a channel quality indicator (CQI) from the signal received from the UE according to the DL/UL HARQ-ACK transmission and reception timing. The obtained UL ACK/NACK or CQI is applied to the scheduler 603 for use in determining retransmission of PDSCH data and a modulation and coding scheme (MCS). The obtained UL ACK/NACK is applied to the controller 601 for use in controlling PDSCH transmission timing.

Although the UE is not shown in the drawings, the UE may include a receiver corresponding to the transmitter 602 of the BS and a transmitter corresponding to the receiver 604 of the BS. More specifically, the receiver of the UE may include a demultiplexer, a PDCCH block, a PDSCH block, and a PHICH block, and the transmitter of the UE may include a PUSCH block, a PUCCH block, and a multiplexer. The controller of the UE may control the transmitter and the receiver to use a PUCCH transmission resource, which has been configured for a particular UE, for other purposes according to UL/DL HARQ-ARQ transmission and reception timing of the BS.

Various embodiments of the present disclosure provide a method and apparatus for allocating resources by a BS in a CA system. Thus, the BS sets a control channel format for transmitting a feedback with respect to DL data to the UE, configures a resource for transmitting the control channel format for the UE based on the set control channel format, and uses the configured control channel transmission resource for control channel transmission or UL data transmission for another UE in a cell without causing system performance degradation, if there is no scheduling in the cell or a subframe of the cell is an UL subframe or is a special subframe in which a PDSCH is not transmitted, when DL data of cells having different duplex structures or the same duplex structure is scheduled.

Other effects that may be obtained or expected from the embodiments of the present disclosure are explicitly or implicitly disclosed in the detailed description of the embodiment of the present disclosure. For example, various effects expected from various embodiments of the present disclosure have been disclosed in the detailed description of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for allocating resources by a base station (BS) in a carrier aggregation (CA) system, the method comprising:
configuring a first cell and a second cell for a first user equipment (UE);
identifying at least one second subframe of the first cell, the at least one second subframe being associated with feedback information to be received in a first subframe of the first cell, and at least one third subframe of the second cell;
determining whether there is a downlink (DL) data transmission in the at least one third subframe of the second cell; and
determining to allocate other frequency resources, which are other than a frequency resource used for transmission of the feedback information in the first subframe, to a second UE if there is no DL data transmission in the at least one third subframe of the second cell.

2. The method of claim 1, wherein the determining of whether there is the DL data transmission comprises determining that there is no DL data transmission in the at least one third subframe if the second cell has a time division duplex (TDD) structure and the at least one third subframe is an uplink (UL) subframe.

3. The method of claim 1, wherein the determining of whether there is the DL data transmission comprises determining that there is no DL data transmission in the at least one third subframe if DL data transmission is not scheduled in the at least one third subframe.

4. The method of claim 3, wherein if the second cell has a time division duplex (TDD) structure, the at least one third subframe is a DL subframe or is a special subframe comprising a downlink pilot time slot (DwPTS), a guard period (GP), and an uplink pilot time slot (UpPTS), in which a length of the DwPTS is longer than or equal to a minimum length in which DL data transmission is possible, and
   if the second cell has a frequency division duplex (FDD) structure, the at least one third subframe is a subframe on a DL frequency.

5. The method of claim 1, wherein the determining of whether there is the DL data transmission comprises determining that there is no DL data transmission in the at least one third subframe if the second cell has a time division duplex (TDD) structure, if the at least one third subframe comprises a downlink pilot time slot (DwPTS), a guard period (GP), and an uplink pilot time slot (UpPTS), and if a length of the DwPTS is shorter than a minimum length in which DL data transmission is possible.

6. The method of claim 5, further comprising transmitting information regarding the length of the DwPTS to the first UE through high layer signaling.

7. The method of claim 5, wherein a length of the DwPTS, a length of the GP, and a length of the UpPTS are determined based upon special subframe configuration information.

8. The method of claim 1, wherein the first cell has one of a frequency division duplex (FDD) structure and a time division duplex (TDD) structure.

9. The method of claim 1, further comprising transmitting control information indicating the frequency resource in the first subframe allocated to the second UE to the second UE.

10. The method of claim 1, further comprising receiving feedback information corresponding to data transmitted in the at least one second subframe of the first cell in the first subframe of the first cell.

11. The method of claim 9, wherein the feedback information comprises a hybrid automatic repeat request (HARQ) feedback corresponding to data transmitted in the at least one second subframe of the first cell and data transmitted in the at least one third subframe of the second cell.

12. The method of claim 9, wherein the feedback information comprises decoding results with respect to data transmitted in the at least one second subframe of the first cell and bits of a hybrid automatic repeat request (HARQ) feedback mapped to discontinuous transmission (DTX) with respect to data transmitted in the at least one third subframe of the second cell.

13. An apparatus for allocating resources in a base station (BS) in a carrier aggregation (CA) system, the apparatus comprising:
   a transceiver configured to communicate a radio signal with a first user equipment (UE) and a second UE; and
   a controller configured to:
      configure a first cell and a second cell for the first UE;
      identify at least one second subframe of the first cell, the at least one second subframe being associated with feedback information to be received in a first subframe of the first cell, and at least one third subframe of the second cell;
      determine whether there is a downlink (DL) data transmission in the at least one third subframe of the second cell; and
      determine to allocate other frequency resources, which are other than a frequency resource used for transmission of the feedback information in the first subframe, to a second UE if there is no DL data transmission in the at least one third subframe of the second cell.

14. The apparatus of claim 13, wherein the controller is further configured to determine that there is no DL data transmission in the at least one third subframe if the second cell has a time division duplex (TDD) structure and the at least one third subframe is an uplink (UL) subframe.

15. The apparatus of claim 13, wherein the controller is further configured to determine that there is no DL data transmission in the at least one third subframe if DL data transmission is not scheduled in the at least one third subframe.

16. The apparatus of claim 15, wherein if the second cell has a time division duplex (TDD) structure, the at least one third subframe is a DL subframe or is a special subframe comprising a downlink pilot time slot (DwPTS), a guard period (GP), and an uplink pilot time slot (UpPTS), in which a length of the DwPTS is longer than or equal to a minimum length in which DL data transmission is possible, and
   if the second cell has a frequency division duplex (FDD) structure, the at least one third subframe is a subframe on a DL frequency.

17. The apparatus of claim 13, wherein the controller is further configured to determine that there is no DL data transmission in the at least one third subframe, if the second cell has a time division duplex (TDD) structure, if the at least one third subframe comprises a downlink pilot time slot (DwPTS), a guard period (GP), and an uplink pilot time slot (UpPTS), and if a length of the DwPTS is shorter than a minimum length in which DL data transmission is possible.

18. The apparatus of claim 17, wherein the transceiver is further configured to transmit information regarding the length of the DwPTS to the first UE through high layer signaling.

19. The apparatus of claim 17, wherein a length of the DwPTS, a length of the GP, and a length of the UpPTS are determined based upon special subframe configuration information.

20. The apparatus of claim 17, wherein the first cell has one of a frequency division duplex (FDD) structure and a time division duplex (TDD) structure.

21. The apparatus of claim 13, wherein the transceiver is figured configured to transmit control information indicating the frequency resource in the first subframe allocated to the second UE to the second UE.

22. The apparatus of claim 13, wherein the transceiver is further configured to receive the feedback information corresponding to data transmitted in the at least one second subframe of the first cell in the first subframe of the first cell.

23. The apparatus of claim 13, wherein the feedback information comprises a hybrid automatic repeat request (HARQ) feedback corresponding to data transmitted in the at least one second subframe of the first cell and data transmitted in the at least one third subframe of the second cell.

24. The apparatus of claim 13, wherein the feedback information comprises decoding results with respect to data transmitted in the at least one second subframes of the first cell and bits of a hybrid automatic repeat request (HARQ) feedback mapped to discontinuous transmission (DTX) with respect to data transmitted in the at least one third subframes of the second cell.

* * * * *